United States Patent
Tsuchiya et al.

(10) Patent No.: US 8,610,985 B2
(45) Date of Patent: Dec. 17, 2013

(54) OPTICAL SCANNING DEVICE AND IMAGE FORMING APPARATUS

(75) Inventors: Satoshi Tsuchiya, Kanagawa (JP); Tomohiro Nakajima, Kanagawa (JP); Mitsuo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 12/333,953

(22) Filed: Dec. 12, 2008

(65) Prior Publication Data

US 2009/0153933 A1 Jun. 18, 2009

(30) Foreign Application Priority Data

Dec. 13, 2007 (JP) ................................ 2007-321562
Mar. 12, 2008 (JP) ................................ 2008-062137

(51) Int. Cl.
*G02B 26/08* (2006.01)
*G02B 26/10* (2006.01)
*G02B 26/12* (2006.01)

(52) U.S. Cl.
USPC .................. 359/213.1; 359/214.1; 359/215.1

(58) Field of Classification Search
USPC ........... 359/196.1–226.3, 290–295, 838, 846, 359/871, 872, 904; 250/204, 559.06, 250/559.29, 230, 234; 347/255–260; 353/39, 98–99; 385/15–18, 22; 398/12, 398/19, 45
See application file for complete search history.

(56) References Cited

U.S. PATENT DOCUMENTS

| | | |
|---|---|---|
| 4,726,640 A | 2/1988 | Iwama et al. |
| 4,853,710 A | 8/1989 | Shimada et al. |
| 5,069,515 A | 12/1991 | Itami et al. |
| 5,633,744 A | 5/1997 | Nakajima et al. |
| 5,671,077 A | 9/1997 | Imakawa et al. |
| 5,726,699 A | 3/1998 | Itami et al. |
| 5,739,602 A | 4/1998 | Suzuki et al. |
| 5,753,907 A | 5/1998 | Nakajima et al. |
| 5,769,544 A | 6/1998 | Suzuki et al. |
| 5,786,594 A | 7/1998 | Ito et al. |
| 5,793,408 A | 8/1998 | Nakajima et al. |
| 5,936,756 A | 8/1999 | Nakajima et al. |
| 5,999,345 A | 12/1999 | Nakajima et al. |
| 6,052,211 A | 4/2000 | Nakajima et al. |

(Continued)

FOREIGN PATENT DOCUMENTS

| | | |
|---|---|---|
| JP | 63-261318 | 10/1988 |
| JP | 11-14932 | 1/1999 |

(Continued)

OTHER PUBLICATIONS

Machine translation of JP 2007-078722 A.*

*Primary Examiner* — Stephone Allen
*Assistant Examiner* — Kimberly N Kakalec
(74) *Attorney, Agent, or Firm* — Dickstein Shapiro LLP

(57) ABSTRACT

A disclosed optical scanning device includes a light source unit configured to emit a laser beam; an oscillating mirror configured to deflect the laser beam from the light source unit; a scanning/imaging optical system configured to focus the deflected laser beam on a target surface; and plural light-receiving elements configured to receive the laser beam in a scanning area of the laser beam, the position of the oscillating mirror being adjusted such that time intervals between output pulses in output signals of the respective light-receiving elements become substantially the same between the light-receiving elements and/or widths of the output pulses become substantially the same between the light-receiving elements.

3 Claims, 20 Drawing Sheets

(56) References Cited

U.S. PATENT DOCUMENTS

| | | |
|---|---|---|
| 6,091,534 A | 7/2000 | Nakajima et al. |
| 6,580,186 B1 | 6/2003 | Suzuki et al. |
| 6,621,512 B2 | 9/2003 | Nakajima et al. |
| 6,657,765 B2 | 12/2003 | Hayashi et al. |
| 6,775,041 B1 | 8/2004 | Nakajima et al. |
| 6,778,203 B2 | 8/2004 | Itami et al. |
| 6,822,775 B2 | 11/2004 | Suzuki et al. |
| 6,839,157 B2 | 1/2005 | Ono et al. |
| 6,932,271 B2 | 8/2005 | Nakajima et al. |
| 6,972,883 B2 | 12/2005 | Fujii et al. |
| 6,995,885 B2 | 2/2006 | Nakajima et al. |
| 7,045,773 B2 | 5/2006 | Suzuki et al. |
| 7,050,082 B2 | 5/2006 | Suzuki et al. |
| 7,068,296 B2 | 6/2006 | Hayashi et al. |
| 7,075,688 B2 | 7/2006 | Nakajima et al. |
| 7,167,288 B2 | 1/2007 | Miyatake et al. |
| 7,170,660 B2 | 1/2007 | Nakajima et al. |
| 7,221,493 B2 | 5/2007 | Fujii et al. |
| 7,333,254 B2 | 2/2008 | Amada et al. |
| 7,403,316 B2 | 7/2008 | Amada et al. |
| 7,411,712 B2 | 8/2008 | Nakajima et al. |
| 7,417,780 B2 | 8/2008 | Fujii et al. |
| 7,423,787 B2 | 9/2008 | Nakajima et al. |
| 7,453,615 B2 | 11/2008 | Nakajima et al. |
| 2002/0163702 A1 | 11/2002 | Hori et al. |
| 2003/0021497 A1* | 1/2003 | Kandori et al. ............... 382/323 |
| 2003/0053156 A1 | 3/2003 | Satoh et al. |
| 2004/0036936 A1 | 2/2004 | Nakajima et al. |
| 2004/0051033 A1* | 3/2004 | Hagen et al. ............... 250/234 |
| 2004/0119002 A1* | 6/2004 | Bush et al. ............... 250/234 |
| 2004/0223195 A1 | 11/2004 | Nomura |
| 2005/0062836 A1 | 3/2005 | Nakajima |
| 2005/0105156 A1 | 5/2005 | Ono et al. |
| 2005/0185237 A1 | 8/2005 | Nakajima |
| 2005/0190420 A1 | 9/2005 | Imai et al. |
| 2005/0243396 A1 | 11/2005 | Fujii et al. |
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0209166 A1 | 9/2006 | Suzuki et al. |
| 2006/0232660 A1 | 10/2006 | Nakajima et al. |
| 2006/0245009 A1* | 11/2006 | Akiyama et al. ............... 358/474 |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0146738 A1 | 6/2007 | Nakajima |
| 2007/0146851 A1 | 6/2007 | Nakajima |
| 2007/0146856 A1* | 6/2007 | Nakajima ............... 359/224 |
| 2007/0206259 A1* | 9/2007 | Nakajima ............... 359/213 |
| 2007/0236557 A1 | 10/2007 | Imai et al. |
| 2008/0024590 A1* | 1/2008 | Nakajima ............... 347/260 |
| 2008/0062491 A1 | 3/2008 | Nakamura et al. |
| 2008/0068678 A1 | 3/2008 | Suzuki et al. |
| 2008/0088889 A1 | 4/2008 | Suzuki |
| 2008/0117487 A1 | 5/2008 | Amada et al. |
| 2008/0170282 A1 | 7/2008 | Amada et al. |
| 2008/0192323 A1 | 8/2008 | Nakamura et al. |
| 2008/0204846 A1 | 8/2008 | Itabashi et al. |
| 2008/0204852 A1 | 8/2008 | Amada et al. |
| 2008/0212156 A1 | 9/2008 | Nakajima |
| 2008/0212999 A1 | 9/2008 | Masuda et al. |
| 2008/0239433 A1 | 10/2008 | Amada et al. |
| 2009/0147336 A1* | 6/2009 | Suzuki et al. ............... 359/199.1 |

FOREIGN PATENT DOCUMENTS

| | | |
|---|---|---|
| JP | 11-38348 | 2/1999 |
| JP | 3049606 | 3/2000 |
| JP | 2002-296534 | 10/2002 |
| JP | 3450653 | 7/2003 |
| JP | 2004-70109 | 3/2004 |
| JP | 2004-198798 | 7/2004 |
| JP | 2004-271906 | 9/2004 |
| JP | 2004-287212 | 10/2004 |
| JP | 2004-287380 | 10/2004 |
| JP | 2005-202321 | 7/2005 |
| JP | 2005-266015 | 9/2005 |
| JP | 2005-292627 | 10/2005 |
| JP | 2006-243034 | 9/2006 |
| JP | 2007-58205 | 3/2007 |
| JP | 2007-078722 | 3/2007 |
| JP | 2007-171854 | 7/2007 |
| JP | 2007-233235 | 9/2007 |

* cited by examiner

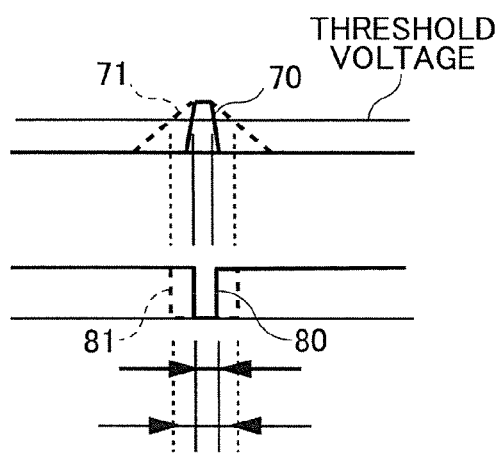

OPTICAL SCANNING DEVICE AND IMAGE FORMING APPARATUS

BACKGROUND OF THE INVENTION

1. Field of the Invention

The present invention generally relates to an optical scanning device and an image forming apparatus including the optical scanning device.

2. Description of the Related Art

To achieve high speed printing and high image quality with a laser color image forming apparatus, it is generally necessary to accurately rotate a polygon scanner at a speed as high as 25000 rpm or more. Meanwhile, to reduce the diameter of a laser beam and thereby improve image quality, it is necessary to increase the inradius or the length in the main scanning direction of a polygon mirror of a polygon scanner. For these reasons, the workload of a polygon scanner in a laser image forming apparatus is becoming higher and higher.

This high workload in turn increases the power consumption of a polygon scanner and the resultant heat adversely affects optical elements such as a scanning lens. For example, the heat increases the temperature of a scanning lens located closest to the polygon scanner. The heat from the polygon scanner is transferred by conduction via an optical housing or by radiation to the scanning lens. The scanning lens is not uniformly heated. Instead, the heated scanning lens tends to have a temperature distribution particularly in the main-scanning direction or the length direction because of the difference in distance from the heat source (polygon scanner), the difference in thermal expansion coefficient of the materials, or air current.

The temperature distribution in the main-scanning direction affects the shape accuracy and refractive index of the scanning lens, thereby changes the position of a laser beam spot, and therefore reduces image quality. This problem is particularly prominent in a scanning lens made of plastic with a high thermal expansion coefficient.

In a laser color image forming apparatus, multiple laser beams corresponding to respective colors (yellow, magenta, cyan, and black) are used. Therefore, in addition to the temperature distribution of a scanning lens, the temperature difference between optical scanning systems corresponding to the respective colors may also cause a problem. The temperature difference affects relative positions of laser beam spots corresponding to respective colors and thereby causes a color shift of an image.

Also, temperature rise caused by a highly-loaded polygon mirror induces minute movement of components of a rotating body (particularly, the polygon mirror that has a high mass ratio), changes the balance of the rotating body, and thereby causes vibration. If the thermal expansion coefficients of components (e.g., a polygon mirror, a flange on which a rotor magnet is fixed, and a shaft) of a rotating body are different or if the tolerance and fixing method of the components are not properly managed and examined, minute movement of the components (a change in balance of the rotating body) occurs during high-temperature, high-speed rotation and as a result, the vibration is increased. Further, the vibration is amplified and transmitted to an optical element (e.g., a reflective mirror) in the optical scanning device and causes banding, image degradation, and noise.

To solve the above problems, use of an oscillating mirror, which employs resonance phenomena, instead of a polygon mirror deflector has been proposed (see, for example, patent documents 1 through 4). An oscillating mirror consumes less power, and therefore using an oscillating mirror reduces temperature rise of a scanning lens used in an optical scanning device. This in turn reduces vibration of an optical scanning device and reduces temperature difference between optical scanning systems in a laser color image forming apparatus.

However, because an oscillating mirror uses the resonance phenomenon of a torsion beam to obtain a practical oscillation amplitude or angle, the size of a movable mirror of an oscillating mirror is very small and is about 1/10 to 1/5 of a related art polygon mirror in area. This small size of a movable mirror makes it difficult to reduce the diameter of a laser beam spot.

Also, it is difficult to accurately adjust the position of a movable mirror with respect to a reference surface of an optical housing on which a scanning imaging lens is mounted. In a related art polygon mirror, because a machined part and a bearing are formed as a single unit, the machining accuracy determines the accuracy of the polygon mirror. Meanwhile, a movable mirror of an oscillating mirror is generally produced by a semiconductor process and is mounted on a separately-produced bracket. The positional accuracy of a movable mirror tends to be reduced when it is mounted on the bracket.

With a related art optical scanning device using such an oscillating mirror, it is difficult to achieve optical characteristics corresponding to those of a polygon mirror. For example, it is difficult to achieve a desired laser beam diameter on a target surface which is small enough (less than 80 μm in the main- and sub-scanning directions: $1/e^2$ of peak light intensity) to form a high-quality image with a resolution of 600 dpi or higher. This is caused by the small area and low positional accuracy of an oscillating mirror. That is, with such an oscillating mirror, a laser beam from a light source may be eclipsed on the movable mirror and the amplitude center of the movable mirror and the center of a scanning lens may become misaligned. Thus, with a related art oscillating mirror, it is difficult to achieve accuracy required in optical design.

[Patent document 1] Japanese Patent Application Publication No. 2005-202321

[Patent document 2] Japanese Patent Application Publication No. 2007-058205

[Patent document 3] Japanese Patent Application Publication No. 2007-171854

[Patent document 4] Japanese Patent Application Publication No. 2007-233235

In a typical color image forming apparatus, latent images corresponding to black, yellow, magenta, and cyan components of a color image are formed on corresponding photoconductive drums, the latent images are visualized with toners of corresponding colors to form toner images, and the toner images are superposed on a recording medium such as paper and fused onto the recording medium to form the color image (see, for example, patent document 5). In these years, such an image forming apparatus has come to be popularly used as an on-demand printing system for low-cost (or small-scale) printing. Accordingly, there is a growing demand for an image forming apparatus with improved productivity and improved image quality.

[Patent document 5] Japanese Patent Application Publication No. 2004-286852

In an image forming apparatus as described above, a laser beam emitted from a light source is caused to fall on a deflection surface of a deflector by an optical system including multiple optical elements and the laser beam deflected by the deflector is focused on a target surface by a scanning optical system including multiple optical elements such as scanning lenses. To form a high-resolution image with no defect such as a color shift using the image forming apparatus, it is necessary to accurately adjust the optical positional relationships between optical elements including the light source and the deflector and the target surface and thereby to cause the laser beam to accurately fall on the target surface. Also, because optical characteristics of an image forming apparatus are affected by manufacturing errors, mounting errors, and aging deterioration of components including optical elements, it is necessary to make adjustments unique to the image forming apparatus when assembling the image forming apparatus or during regular checkups to maintain the optical characteristics.

SUMMARY OF THE INVENTION

Aspects of the present invention provide an optical scanning device and an image forming apparatus that solve or reduce one or more problems caused by the limitations and disadvantages of the related art.

According to an aspect of the present invention, an optical scanning device includes a light source unit configured to emit a laser beam; an oscillating mirror configured to deflect the laser beam from the light source unit; a scanning/imaging optical system configured to focus the deflected laser beam on a target surface; and a plurality of light-receiving elements configured to receive the laser beam in a scanning area of the laser beam, the position of the oscillating mirror being adjusted such that time intervals between output pulses in output signals of the respective light-receiving elements become substantially the same between the light-receiving elements and/or widths of the output pulses become substantially the same between the light-receiving elements.

Another aspect of the present invention provides an optical scanning device for scanning a target surface with a laser beam in a main-scanning direction. The optical scanning device includes a light source configured to emit the laser beam; a deflector including a deflection surface configured to rotate about a first axis that is orthogonal to the main-scanning direction and to deflect the laser beam emitted from the light source; and a supporting part configured to support the deflector so as to be rotatable about a second axis that is parallel to the main-scanning direction.

Still another aspect of the present invention provides an image forming apparatus including an optical scanning device as mentioned above.

BRIEF DESCRIPTION OF THE DRAWINGS

FIG. 7 is a drawing illustrating the relationship between an output waveform of a light-receiving element and an output waveform of a comparator circuit;

DESCRIPTION OF THE PREFERRED EMBODIMENTS

Preferred embodiments of the present invention are described below with reference to the accompanying drawings.

Figure 1:
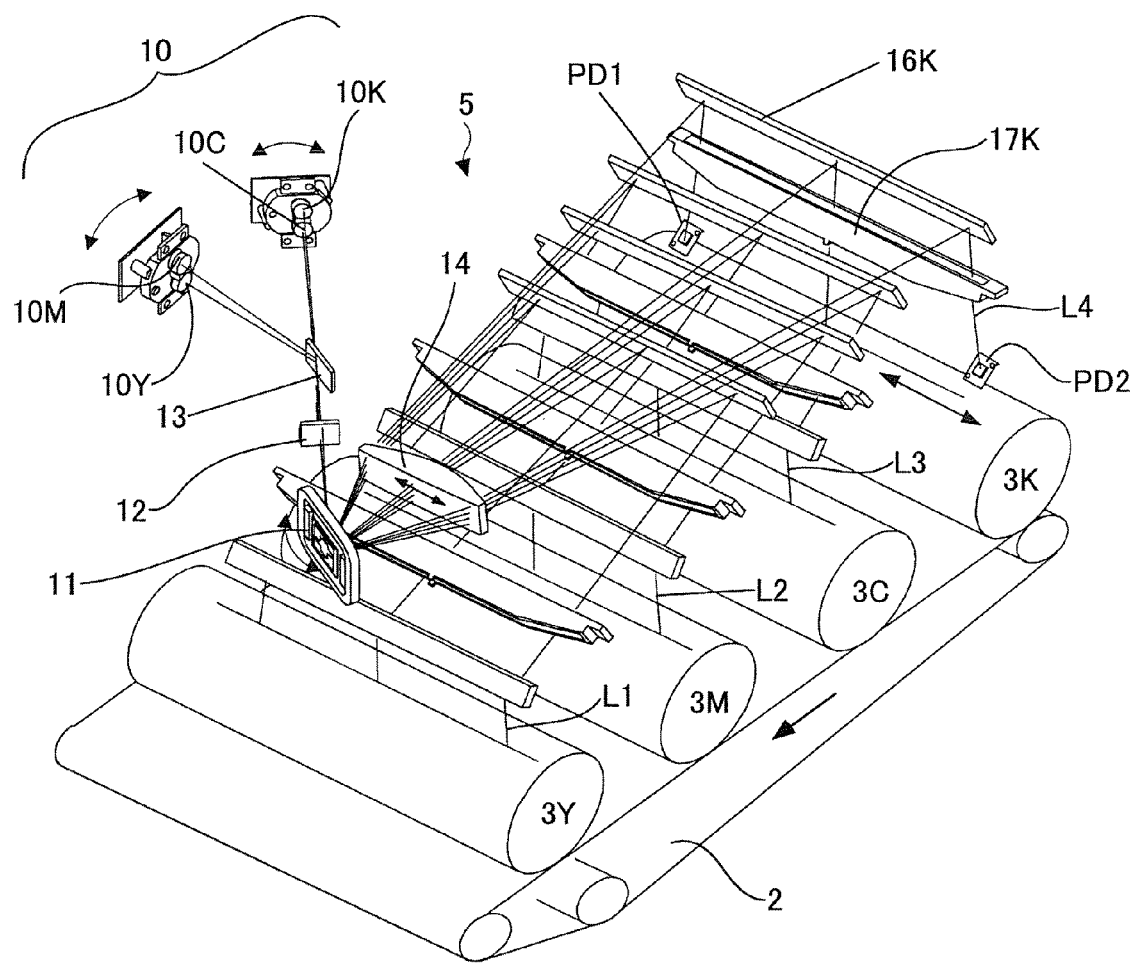
FIG. 1 is a perspective view illustrating a configuration of an optical scanning device according to an embodiment of the present invention.

An exemplary configuration of an optical scanning device according to an embodiment of the present invention is described below. FIG. 1 is a perspective view illustrating a configuration of an optical scanning device 5 according to an embodiment of the present invention.

Figure 11:
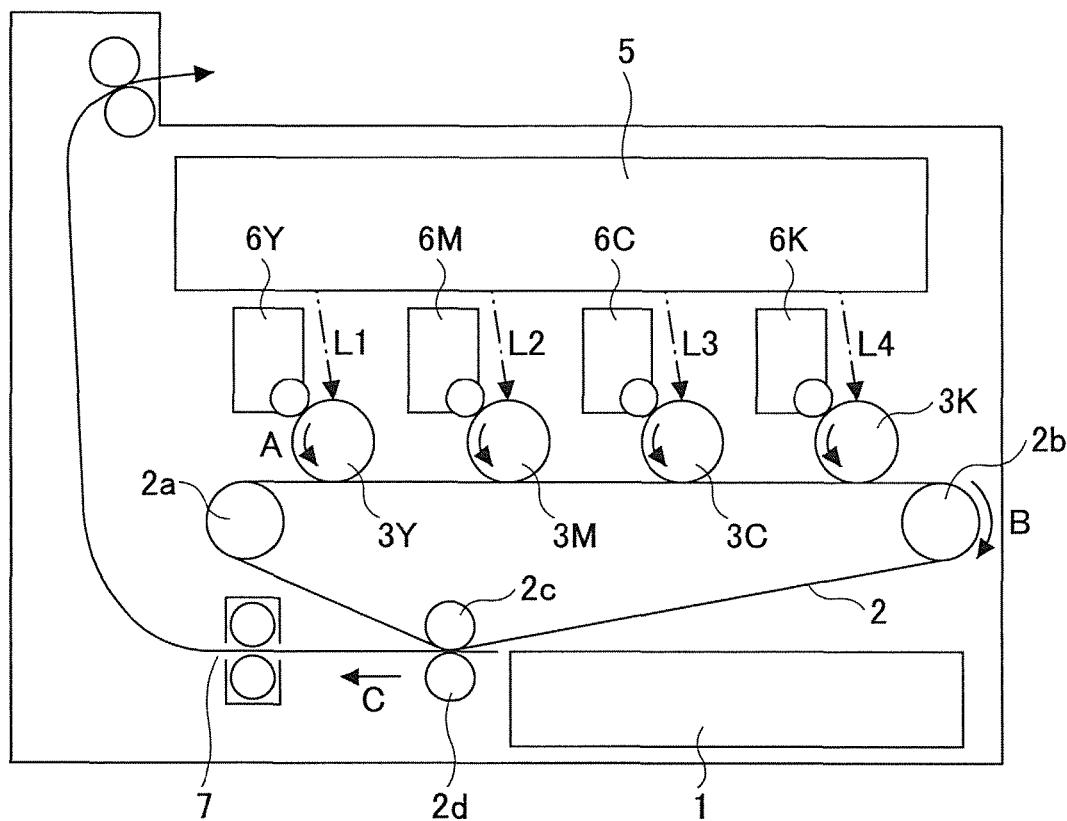
FIG. 11 is a schematic diagram illustrating a configuration of a color image forming apparatus according to an embodiment of the present invention.

The optical scanning device 5 of this embodiment is to be placed above an imaging unit including four photoconductors 3Y, 3M, 3C, and 3K (Y, M, C, and K indicate yellow, magenta, cyan, and black, respectively) of an image forming apparatus shown in FIG. 11. The optical scanning device 5 includes four light sources 10 corresponding to the respective colors, a light deflecting unit (oscillating mirror) 11 for deflecting and scanning laser beams from the light sources 10, and a scanning/imaging optical system for guiding the laser beams onto surfaces of the photoconductors 3. These components of the optical scanning device 5 are housed in an optical housing (not shown).

Each of the light sources 10 (10Y, 10M, 10C, and 10K) includes a semiconductor laser and a coupling lens. The semiconductor lasers of the light sources 10 emit corresponding laser beams to write yellow, magenta, cyan, and black color components of an image. The laser beam emitted from each of the semiconductor lasers is converted by the coupling lens into a laser beam suitable for the downstream optical system (a collimated laser beam or a slightly divergent or convergent laser beam). Then, the converted laser beam is deflected by a reflective mirror 13 and focused in the sub-scanning direction by a cylindrical lens 12 to form a line image, which is long in the main-scanning direction, near a deflection surface of the oscillating mirror 11 used as a deflection/scanning unit.

A laser beam transmitting part (not shown) is provided near the light-incident side of the oscillating mirror 11. The laser beams from the light sources 10 enter the oscillating mirror 11 through the laser beam transmitting part. The four laser beams corresponding to the four colors are deflected in the same direction by the oscillation of the oscillating mirror 11 and are thereby caused to pass through a first lens 14 constituting a part of a scanning lens group of the scanning/imaging optical system.

The laser beam corresponding to the black component (which, for example, passes through the first lens 14 near its upper end) is reflected by a mirror 16K and is focused by a second lens 17K constituting a part of the scanning lens group to form a light spot on the drum-shaped photoconductor 3K and thereby to scan the surface (target surface) of the photoconductor 3K in the directions of the arrows. The first lens 14 and the second lens 17K are, for example, made of a plastic material that is low-priced and can be easily formed into an aspherical shape. For example, polycarbonate or a synthetic resin consisting mainly of polycarbonate, which has a low water absorption rate, high transmittance, and high moldability, is preferably used.

Similarly, the laser beams corresponding to yellow, magenta, and cyan components are reflected by mirrors and are focused by lenses to form light spots on the corresponding photoconductors 3Y, 3M, and 3C and thereby to scan the surfaces of the photoconductors 3Y, 3M, and 3C in the directions of the arrows. As a result of scanning by the laser beams, electrostatic latent images for the color components are formed on the corresponding photoconductors 3. In FIG. 1, optical elements similar to those provided for the black component are also provided for the yellow, magenta, and cyan components. However, reference numbers of the optical elements corresponding to color components other than the black component are omitted for brevity.

The formed electrostatic latent images are visualized (developed) by a developing unit with toners of the corresponding colors and the developed toner images are transferred onto an intermediate transfer belt 2. In this process, the toner images are superposed to form a color image. The color image is transferred onto a sheet-shaped recording medium and fused to the recording medium. After the color image is transferred, the intermediate transfer belt 2 is cleaned by a cleaning unit.

As described above, the optical scanning device 5 of FIG. 1 includes the oscillating mirror 11 (deflection/scanning unit) for deflecting and scanning laser beams emitted from light sources corresponding to two or more color components of a color image in the same direction, the first lens 14 commonly used for the laser beams, and four optical scanning systems provided for the respective color components and including second lenses (e.g., lens 17K for the black component) for focusing the laser beams on the corresponding target surfaces. The first lens 14 and the optical scanning systems constitute at least a part of the scanning/imaging optical system.

In this embodiment, the laser beams corresponding to color components are incident on the deflection surface of the oscillating mirror 11 at angles with respect to the sub-scanning direction (i.e., oblique incidence). For example, the optical scanning device 5 is configured such that the maximum incident angle of the laser beams becomes less than or equal to 5°. If the incident angle of a laser beam is greater than 5°, the scanning line of the laser beam on a target surface is greatly bent and the diameter of the laser beam spot is increased. As a result, the image quality is reduced. On the other hand, if the incident angle of a laser beam is 0°, it becomes necessary to increase the width in the sub-scanning direction of the deflection surface. This in turn increases the load of the oscillating mirror 11 and makes it difficult to increase the oscillation frequency of the oscillating mirror 11.

Next, details of the oscillating mirror 11 are described.

Figure 2A:
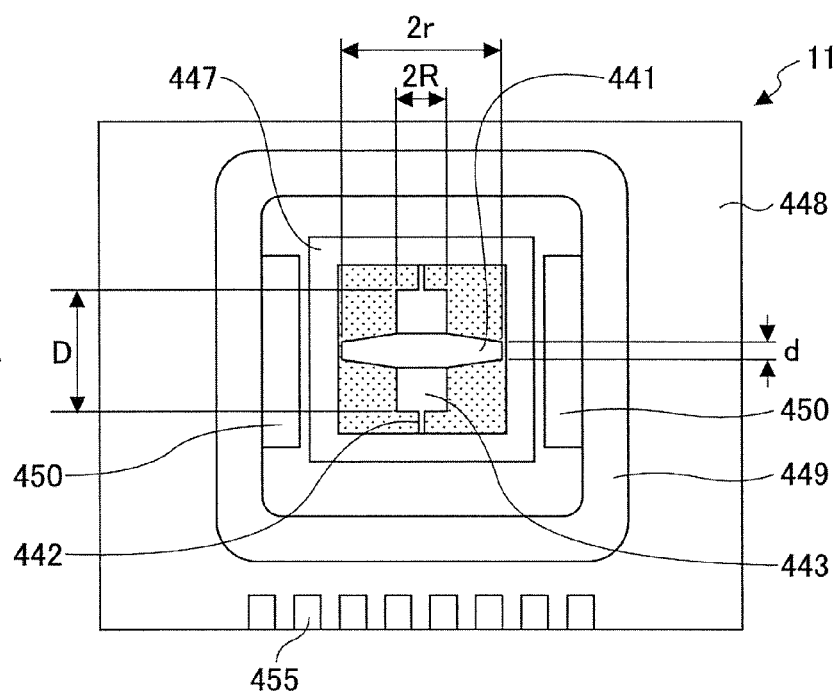
FIG. 2A through 2C are drawings illustrating a configuration of an oscillating mirror.
Figure 2B:
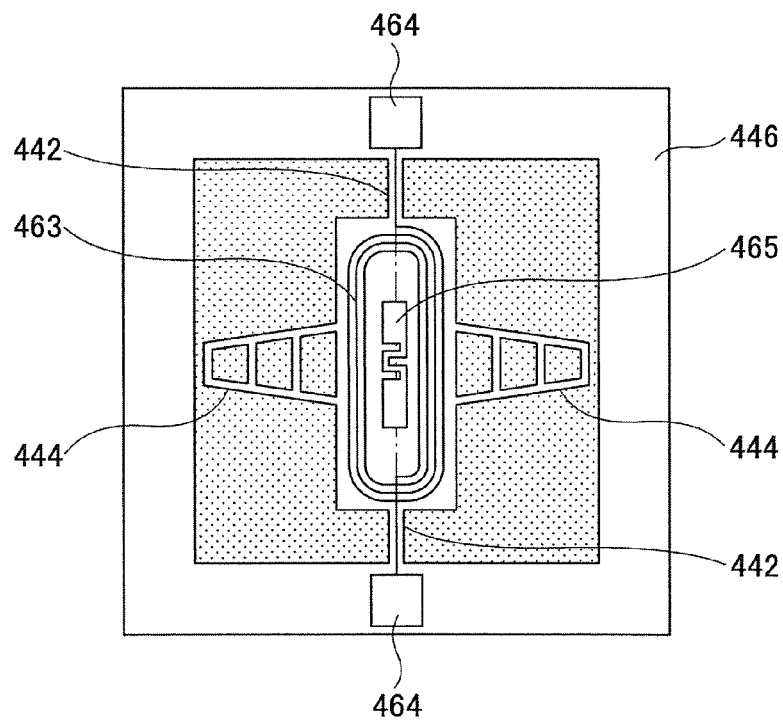
Figure 2C:
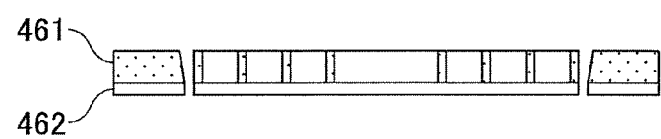
Figure 3:
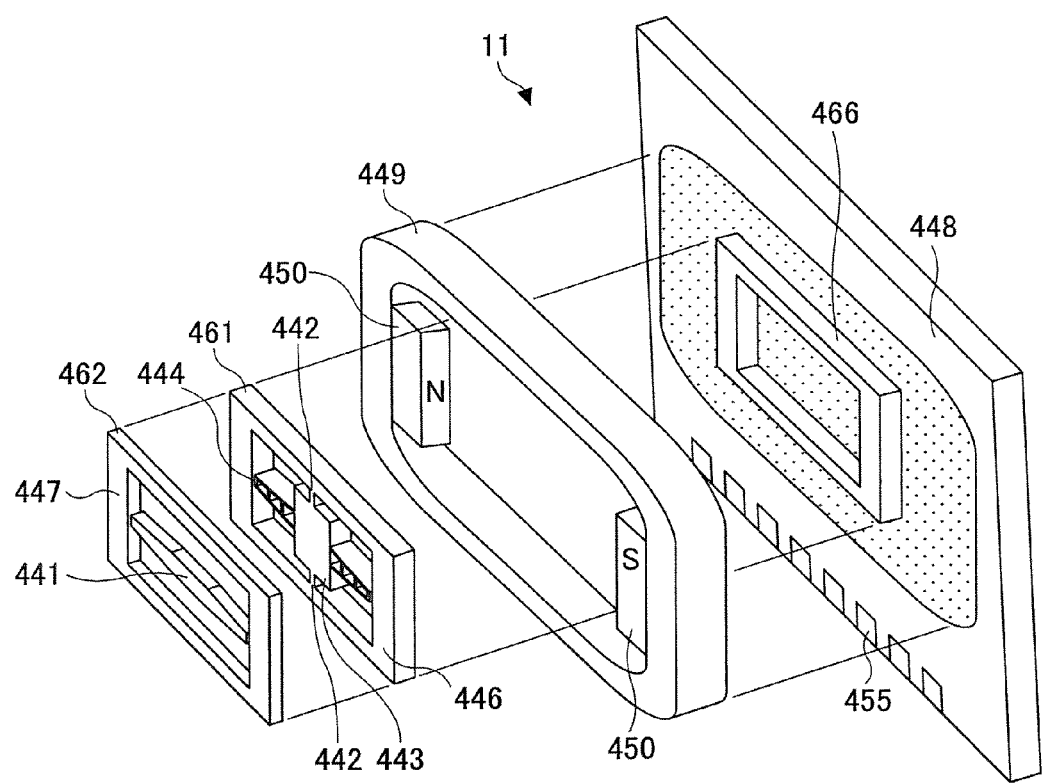
FIG. 3 is an exploded perspective view of an oscillating mirror.
Figure 4:
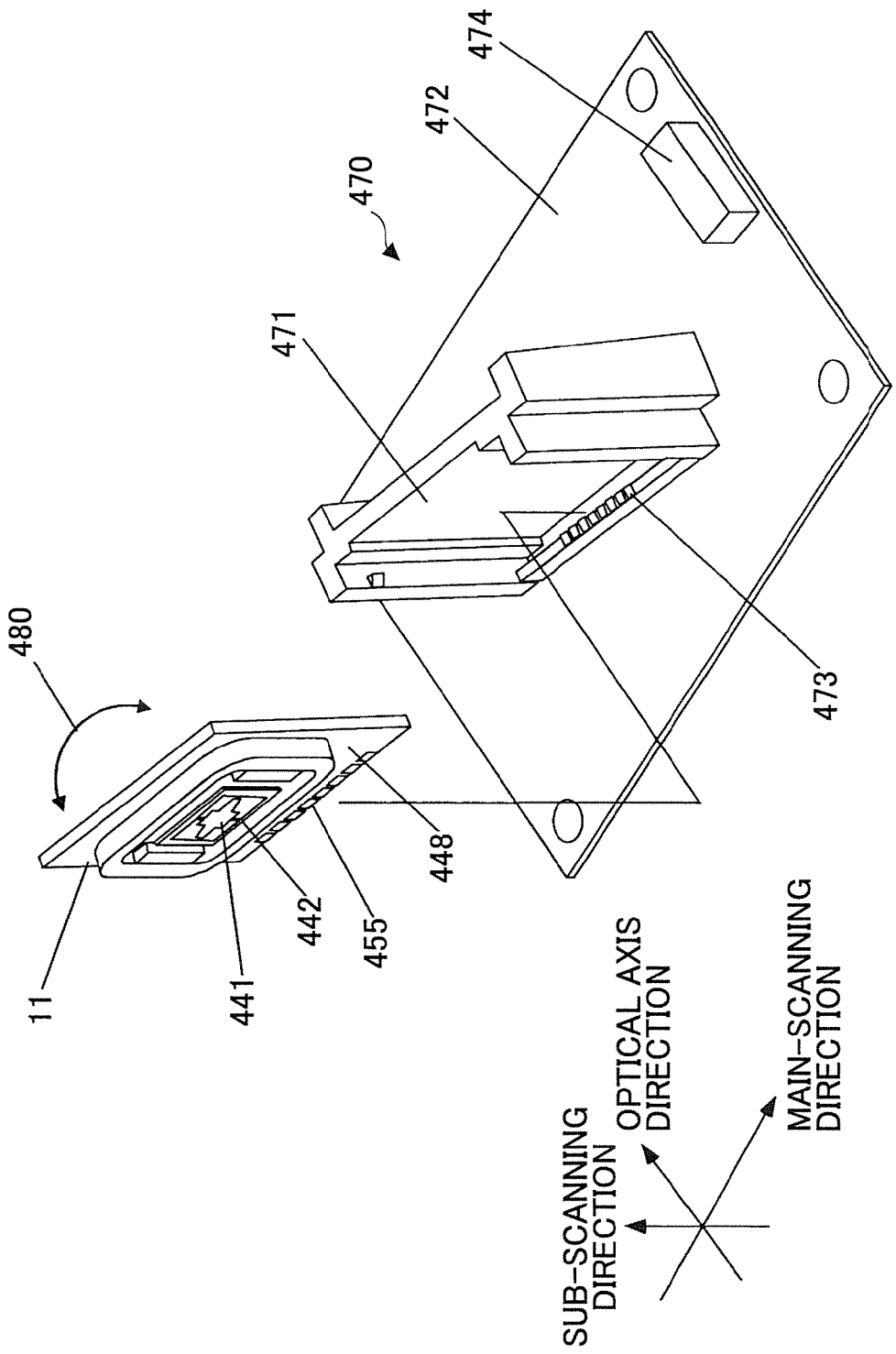
FIG. 4 is an exploded perspective view of an oscillating mirror unit.

FIG. 2A through 2C are drawings illustrating a configuration of the oscillating mirror 11 of this embodiment; and FIG. 3 is an exploded perspective view of the oscillating mirror 11. FIG. 4 is a drawing illustrating an oscillating mirror unit 470 to be mounted on an optical housing.

The oscillating mirror 11 includes a movable mirror part 441 that has a mirror surface on the front side and functions as an oscillator, torsion beams 442 that support the movable mirror part 441 and function as rotational shafts, and a frame 446 that functions as a supporting part and is cut out from a Si substrate by etching.

In this embodiment, the oscillating mirror 11 is produced using a wafer called an SOI substrate that is formed by laminating two substrates having thicknesses of 60 μm (first substrate 462) and 140 μm (second substrate 461) via an oxide film. First, parts of the second substrate 461 other than those corresponding to the torsion beams 442, an oscillation plate 443 on which a planar coil is to be formed, reinforcing beams 444 used as the framework of the movable mirror part 441, and the frame 446 are etched from the surface of the second substrate 461 through to the oxide film by a dry process such as plasma etching. Next, parts of the first substrate 462 other than those corresponding to the movable mirror part 441 and a frame 447 are etched from the surface of the first substrate 462 through to the oxide film by anisotropic etching such as KOH. Then, the oxide film around the movable mirror part 441 is removed to form an oscillating mirror structure (FIGS. 2A and 3). In this embodiment, the widths of the torsion beams 442 and the reinforcing beams 444 are set within a range between 40 and 60 μm.

The moment of inertia I of an oscillator is preferably small to achieve a large oscillation angle. Meanwhile, the inertial force deforms the mirror surface. Therefore, in this embodiment, holes are formed in the reinforcing beams 444 to reduce the weight of the movable part. An aluminum thin-film is deposited on the front surface of the first substrate 462 to form a deflection surface. On the front surface of the second substrate 461, a coil pattern 463 and terminals 464 connected to the coil pattern 463 via the torsion beams 442 are formed with a copper thin film and a patch 465 is formed for trimming (FIGS. 2A and 2B). Alternatively, a thin-film permanent magnet may be provided on the oscillation plate 443 and a planar coil may be formed on the frame 447.

On a mounting substrate 448, a frame-shaped pedestal 466 on which the frame 447 is to be mounted and a yoke 449 formed so as to surround the movable mirror part 441 are provided. A pair of permanent magnets 450 for generating a magnetic field in a direction orthogonal to the rotational axis are attached to the yoke 449 such that the S-pole and the N-pole face each other and also face the corresponding ends of the movable mirror part 441 (FIG. 3).

The oscillating mirror structure is mounted on the pedestal 466 with the mirror surface facing outward. When an electric current is applied between the terminals 464, a Lorentz force is generated at the sides of the coil pattern 463 which are parallel to the rotational axis. The Lorentz force twists the torsion beams 442, i.e., generates rotational torque T that rotates the movable mirror part 441. When the electric current is turned off, the movable mirror part 441 returns to the original horizontal position due to the elastic force of the torsion beams 442.

Thus, the movable mirror part 441 can be caused to oscillate by alternately switching the directions of the electric current flowing through the coil pattern 463. The amplitude of oscillation or the oscillation angle can be increased by setting the frequency of switching the directions of the electric current at a value close to the natural frequency of the first vibration mode, i.e., the resonant frequency f0, where the torsion beams 442 serve as the rotational axis.

The oscillating mirror unit 470 shown in FIG. 4 includes the oscillating mirror 11, a bracket 471 used to fix the position of the oscillating mirror 11 and including an electrode 473 to be electrically connected to an electrode 455 of the oscillating mirror 11, and a substrate 472 used to fix the bracket 471 and to be mounted on the optical housing (not shown). The substrate 472 includes an electric connector 474. The mounting position of the oscillating mirror 11 is adjusted by adjusting the position (orientation, inclination, etc.) of the bracket 471.

The mass and inertia of the movable part (the movable mirror part 441) of the oscillating mirror 11 is far smaller than those of a related-art polygon mirror. With this feature and the effect of a highly-efficient magnetic circuit, the power consumption of the oscillating mirror 11 is far lower than a related-art polygon mirror (e.g., one tenth of the power consumption of a polygon mirror). The low power consumption makes it possible to reduce heat generation and thereby to substantially prevent the increase in temperature of an optical element and a housing of a scanning optical system. This in turn makes it possible to prevent a local temperature distribution of a scanning lens (particularly a scanning lens made of resin), to prevent variation of scanning positions of laser beams used to form a color image, and thereby to prevent a color shift of the image.

Further, because the mass and inertia of the movable part are small, the vibration transmitted to the outside during the oscillation of the movable part (vibration caused by the imbalance of mass) is small (one hundredth of a polygon mirror in vibration acceleration or smaller). In other words, the above configuration makes it possible to substantially eliminate the vibration transmitted to an optical element of a scanning optical system and thereby to prevent banding (variation in density in the sub-scanning direction) caused by the vibration of a reflective mirror during image formation.

Meanwhile, the size of the movable mirror part 441 of the oscillating mirror 11 is very small and this makes it difficult to accurately position (to accurately align the oscillation (rotational) axis of the movable mirror part with an axis in the sub-scanning direction). In this embodiment, this problem is solved by adjusting the mounting position of the oscillating mirror 11 as described below.

Figure 5:
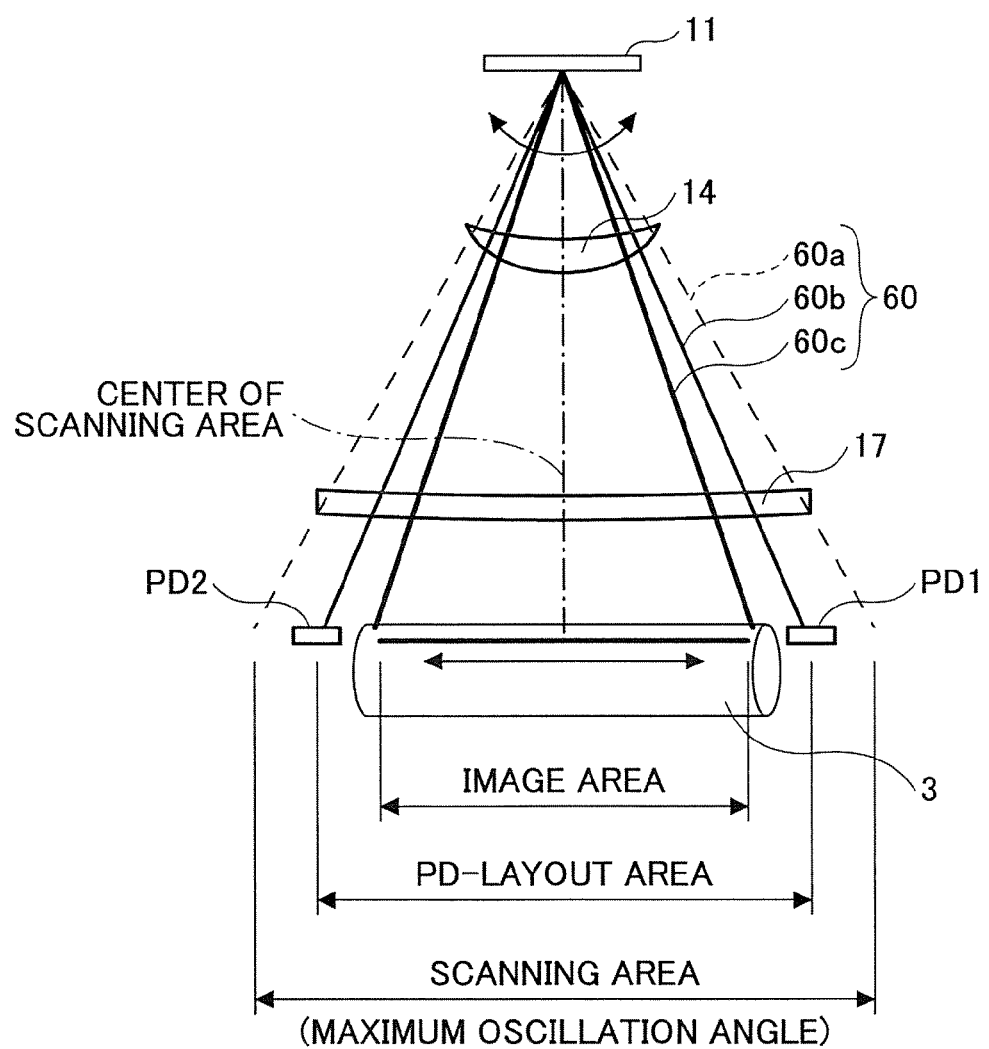
FIG. 5 is a schematic diagram illustrating a part of an optical scanning device from an oscillating mirror to a photoconductor.

FIG. 5 is a schematic diagram illustrating a part of the optical scanning device 5 shown in FIG. 1. For descriptive purposes, FIG. 5 includes only one photoconductor 3 and the corresponding components. In FIG. 5, the scanning positions of a laser beam 60 deflected and scanned by the oscillating mirror 11 are identified by reference numbers as follows: scanning positions 60a at the maximum oscillation angle of the oscillating mirror 11, scanning positions 60b where the laser beam 60 enters light-receiving elements PD1 and PD2 disposed within the maximum oscillation angle, and scanning positions 60c where the laser beam 60 scans the edges of the image area on the photoconductor 3.

Figure 6:
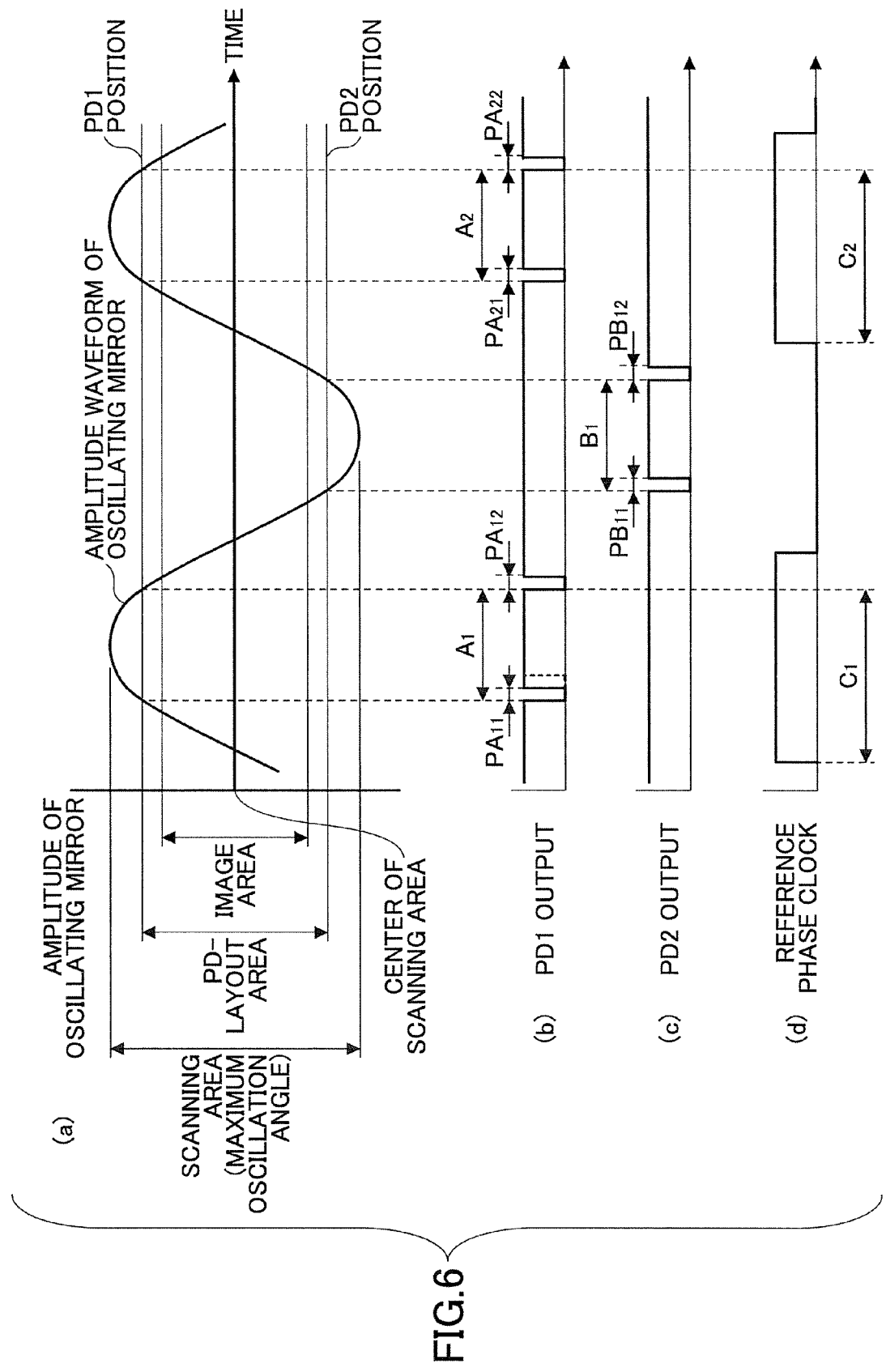
FIG. 6 is a drawing illustrating an amplitude waveform of an oscillating mirror, output signals of light-receiving elements, and a reference phase clock in an optical scanning device.

FIG. 6 (*a*) shows the amplitude of the oscillating mirror 11 in FIG. 5 (the degree of variation in the oscillation angle of the oscillating mirror 11) with respect to time. An oscillating mirror generates a high level of oscillation using resonance phenomena. Therefore, the amplitude of an oscillating mirror varies following a line like a sine wave as time passes and the scanning speed of the deflected laser beam differs depending on the scanning position (if no scanning lens is provided). To make the scanning speed constant, the scanning lenses 14 and 17 have an f-arcsine characteristic.

The position of the oscillating mirror unit 470 is adjusted as described below. First, a laser beam is emitted from the light source 10K (one of the multi-beam light sources is turned on) and the oscillating mirror 11 is driven to cause the laser beam to scan the light-receiving elements PD1 and PD2. When receiving the laser beam, the light-receiving elements PD1 and PD2 output signals as shown in FIGS. 6 (*b*) and (*c*), respectively. Then, the position of the bracket 471 of the oscillating mirror unit 470 shown in FIG. 4 is adjusted in the rotational direction about the oscillation axis of the movable mirror part 441 such that the time interval A ($A_1, A_2, \ldots A_n$) between two output pulses in the output signal of the light-receiving element PD1 matches the time interval B ($B_1, \ldots B_n$) between two output pulses in the output signal of the light-receiving element PD2. The laser beam used to scan the light-receiving elements PD1 and PD2 is focused by the scanning lenses 14 and 17K constituting a part of the scanning/imaging optical system.

Here, if the center in the main-scanning direction of the scanning lenses and the center of oscillation of the oscillation mirror 11 are not aligned after the above adjustment, the diameters of a laser beam on the light-receiving elements PD1 and PD2 increase and also become different from each other. In this case, the pulse width $PA_{11}$ of a first pulse (or the pulse width $PA_{12}$ of a second pulse) in the output signal of the light-receiving element PD1 shown in FIG. 6 (*b*) becomes different from the pulse width $PB_{11}$ of a first pulse (or the pulse width $PB_{12}$ of a second pulse) in the output signal of the light-receiving element PD2 shown in FIG. 6 (*c*). Therefore, the position of the bracket 471 of the oscillating mirror unit 470 is further adjusted to make the pulse width $PA_{11}$ match the pulse width $PB_{11}$.

Meanwhile, when the scanning speed and the intensity of a laser beam are constant, the pulse width varies as the laser beam diameter varies (FIG. 7). FIG. 7 is a drawing illustrating the relationship between a waveform (light-receiving part output waveform) output by a light-receiving part (described later) and a waveform (comparator output waveform) output by a comparator circuit (described later) when the light-receiving element PD1 (or PD2) is scanned by a laser beam. In FIG. 7, a pulse 70 represented by a solid line indicates a pulse output when the laser beam has a desired diameter. In this case, the comparator outputs a pulse 80. When the laser beam scanning the light-receiving part has a larger diameter, the light intensity gradually changes as time passes and the light-receiving part outputs a pulse 71 that rises gradually as indicated by a dotted line. In this case, the comparator outputs a pulse 81 with a greater pulse width. Thus, if the relationship between the laser beam diameter and the pulse width of an output signal of a light-receiving element is found out in advance, it is possible to determine the laser beam diameter based on a measured pulse width. For this purpose, the scanning speed and the intensity of a laser beam are preferably set to match the actual use conditions of an optical scanning device.

As described above, there is a correlation between the pulse widths $PA_{11}$ and $PA_{12}$ of an output signal of the light-receiving element PD1 and the laser beam diameter. To maintain this correlation, it is necessary to at least control the operation of the oscillating mirror 11 to keep the amplitude of its amplitude waveform constant (and to keep the light intensity constant) so that the speed of scanning the light-receiving element PD1 becomes constant (with scanning jitter of 0.02% or lower). If the operation of the oscillating mirror 11 is not controlled, the speed of scanning the light-receiving element PD1 becomes inconstant (and the light intensity becomes inconstant) and this causes the pulse widths $PA_{11}$ and $PA_{12}$ of an output signal of the light-receiving element PD1 to vary. As a result, the correlation between the pulse widths $PA_{11}$ and $PA_{12}$ and the laser beam diameter is lost. This also applies to the light-receiving element PD2. For the above reasons, it is preferable to adjust the position of the bracket 471 of the oscillating mirror unit 470 after controlling the operation of the oscillating mirror 11 to make the amplitude of its amplitude waveform constant.

If the pulse widths in the output signals of the light-receiving elements PD1 and PD2 do not become substantially equal by adjusting the position of the bracket 471 or when it is desired to make the pulse widths accurately match and thereby to reduce the laser beam diameter to the design limit (i.e., when it is desired to more finely adjust the optical scanning device than is possible solely by adjusting the oscillating mirror 11), further adjustment can be done by moving the position of the scanning lens 14 in the main-scanning direction (in the direction of the arrow on the scanning lens 14 shown in FIG. 1) because the scanning lens 14 determines the f-arcsine characteristic.

Because the scanning speed of the oscillating mirror 11 changes according to a substantially sinusoidal wave, the scanning lens 14 is designed to have an f-arcsine characteristic to make the scanning speed constant. However, if the scanning lens 14 and the oscillating mirror 11 are not placed in designed positions, the effect of the f-arcsine characteristic is reduced and the scanning speed and the laser beam diameter deviate from designed values.

Meanwhile, when a laser beam emitted from the light source 10K enters the movable mirror part 441 of the oscillating mirror 11 via an optical element, the laser beam may be eclipsed depending on the position of the light source 10K. This problem is caused because the area of the movable mirror part 441 is small (in this case, in the main-scanning direction) and can be solved by adjusting the position of the light source 10K in the rotational direction about an axis parallel to the sub-scanning direction (in the direction of the arrows attached to the light source 10K in FIG. 1) after adjusting the position of the oscillating mirror 11. Because the eclipse causes the laser beam diameter to change (increases the laser beam diameter), the result of adjusting the position of the light source 10K can also be confirmed by measuring the pulse widths as described above.

The time intervals (A and B shown in FIGS. 6 (b) and (c)) and the pulse widths (PA and PB shown in FIGS. 6 (b) and (c)) of pulses in the output signals from the light-receiving elements PD1 and PD2 are preferably measured multiple times and averaged by an arithmetic unit; and the position of the oscillating mirror 11 is preferably adjusted based on the averaged values (time intervals A and B, and pulse widths PA and PB). Using the averaged values makes it possible to reduce the influence of scanning speed variation caused by jitter and sudden electric noise on the output signals from the light-receiving elements PD1 and PD2 and thereby makes it possible to improve the adjustment accuracy.

Figure 8A:
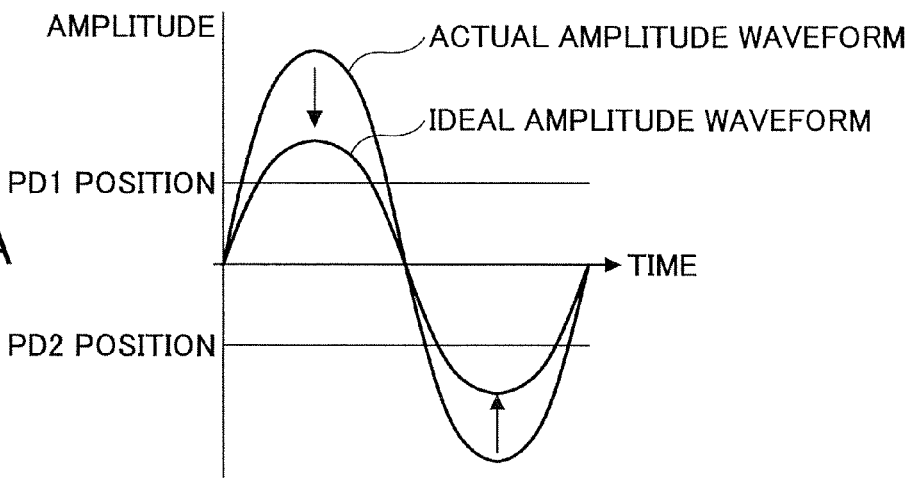
FIG. 8A through 8C are graphs showing amplitude deviation, offset, and phase shift of an amplitude waveform of an oscillating mirror.
Figure 8B:
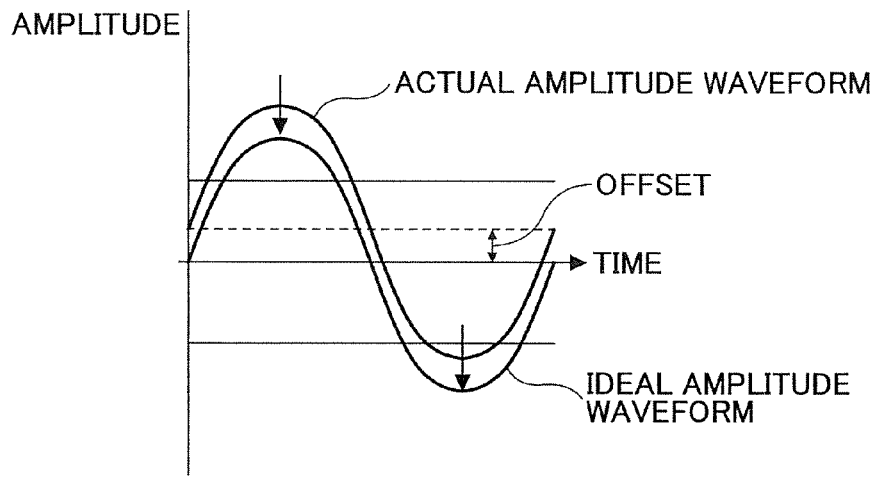
Figure 8C:
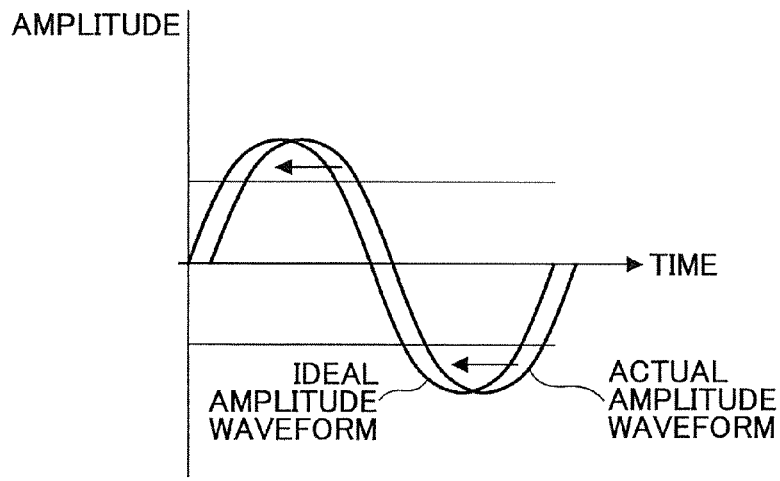

To take advantage of the oscillating mirror 11, it is necessary to control the operation of the oscillating mirror 11 as described below. Even when the scanning lenses 14 and 17 having the f-arcsine characteristic as described above are used, the scanning lenses may not be able to completely offset variation in the oscillation of the oscillating mirror 11 as shown in FIG. 8A through 8C. For example, when the frequency (of the driving signal) of the oscillating mirror 11 is constant, the amplitude of the oscillating mirror 11 is supposed to show an ideal amplitude waveform (sine waveform). However, in practice, the amplitude of the oscillating mirror 11 shows amplitude waveforms that deviate from the ideal amplitude waveform as shown in FIG. 8A through 8C. Such deviation results in variation in the scanning position of a laser beam and degrades image quality.

FIG. 8A shows amplitude deviation where the actual amplitude is greater than (or less than) the ideal amplitude. To correct the actual amplitude in the direction of the arrow to match the ideal amplitude, the oscillating mirror 11 is controlled such that a control value calculated based on the time interval A ($A_1, A_2, \ldots A_n$) between two output pulses in the output signal of the light-receiving element PD1 and the time interval B ($B_1, \ldots B_n$) between two output pulses in the output signal of the light-receiving element PD2 (FIGS. 6 (b) and (c)) becomes constant. For example, the oscillating mirror 11 is controlled such that a grand average of "n" average values $(A_1+B_1)/2, (A_2+B_2)/2, \ldots$ and $(A_n+B_n)/2$ matches a control target value uniquely determined based on the resonance frequency.

FIG. 8B shows the relationship between the amplitude center of an actual amplitude waveform and the center of the scanning area (ideal amplitude waveform) of the oscillating mirror 11. In FIG. 8B, there is an offset between the actual amplitude waveform and the ideal amplitude waveform. To eliminate the offset as indicated by the arrow, the oscillating mirror 11 is controlled such that a control value calculated based on the time interval A ($A_1, A_2, \ldots A_n$) between two output pulses in the output signal of the light-receiving element PD1 and the time interval B ($B_1, \ldots B_n$) between two output pulses in the output signal of the light-receiving element PD2 (FIGS. 6 (b) and (c)) becomes constant. For example, the oscillating mirror 11 is controlled such that the average of "n" differences $A_1-B_1, A_2-B_2, \ldots,$ and $A_n-B_n$ matches a control target value "0".

FIG. 8C shows a phase shift of the amplitude waveform of the oscillating mirror 11. In FIG. 8C, there is a phase shift (in the time axis direction) between the actual amplitude waveform and the ideal amplitude waveform. To correct the phase of the actual amplitude waveform in the direction of the arrow to match the phase of the ideal amplitude waveform, the oscillating mirror 11 is controlled such that the time interval C (phase shift) between a reference phase clock for generating a signal for driving the oscillating mirror 11 and the output signal of the light-receiving element PD1 (FIGS. 6 (b) and (d)) becomes constant. For example, the oscillating mirror 11 is controlled such that the average of multiple time intervals C1, C2, . . . matches a control target value "0". The time interval C is preferably measured based on a latter one of two output pulses, which is output just before the amplitude waveform enters the image area (at the end of the time interval A), in the output signal of the light-receiving element PD1. If the output pulse output at the beginning of the time interval A is used for this purpose, the phase accuracy during image formation is reduced because of phase shift during the time interval A. Therefore, it is preferable to correct the phase of the actual amplitude waveform using the output pulse that is output just before image scanning is started (at the end of the time interval A) to improve the phase accuracy during image formation.

The amplitude deviation or the offset shown in FIGS. 8A and 8B indicate deviation of the actual scanning speed from the ideal scanning speed which causes the scanning position to shift in the main-scanning direction. The shift of the scanning position in turn causes image degradation such as jitter in the main-scanning direction (vertical jitter) and a magnification error in the main-scanning direction in both color and monochrome images. Meanwhile, the phase shift shown in FIG. 8C causes problems particularly in color image formation. In the optical scanning device 5 as shown in FIG. 1, laser beams emitted according to an image signal from light sources corresponding to the respective color components are deflected and scanned by one oscillating mirror 11 over photoconductors provided for the respective color components. In this case, if the phase shift occurs, the deflection/scanning positions of the laser beams are shifted. The shift of the deflection/scanning positions results in a shift in the sub-scanning direction of an image (on the intermediate transfer belt) and causes a color shift or discoloration.

Figure 9:
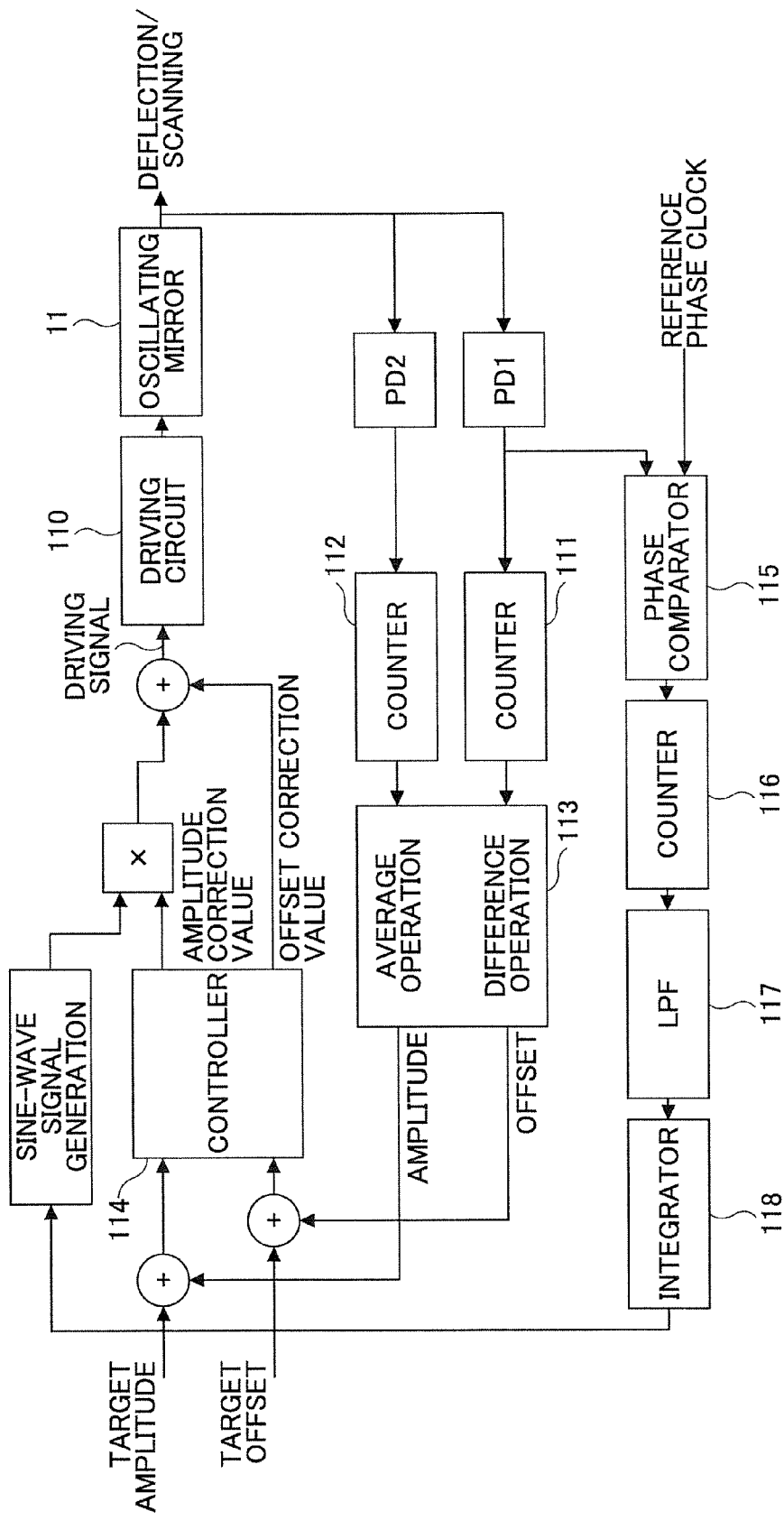
FIG. 9 is a block diagram illustrating a control unit for controlling the operation of an oscillating mirror.

FIG. 9 is a block diagram illustrating a control unit for controlling the operation of the oscillating mirror 11 of the optical scanning device 5 to correct the amplitude deviation, the offset, and the phase shift.

In the control unit shown in FIG. 9, the time intervals A and B of signals, which are output from the light-receiving elements PD1 and PD2 when scanned by a laser beam, are measured by counters 111 and 112. Then, an arithmetic unit 113 compares the average of "(A+B)/2" values with a target amplitude value, compares the average of "A−B" values with a target offset value ("0" in this embodiment), and outputs the comparison results to a controller 114. Here, average values are used to reduce the influence of, for example, sudden electric noise and thereby to prevent the control unit from controlling the oscillating mirror 11 based on incorrect information. Each average value is preferably obtained by averaging two to ten values. Using more than ten values delays the correction timing and increases control error.

The controller 114 calculates correction values for correcting the amplitude deviation and the offset based on the comparison results, causes a driving circuit (amplifier) 110 for driving the oscillating mirror 11 to amplify a driving signal having a corrected sine wave, and thereby controls the oscillating mirror 11. The above control loop represents an amplitude and offset control loop.

After the amplitude and offset are controlled as described above to match or become close to the target values, a phase control loop is executed to cancel the phase shift between an ideal amplitude waveform and an actual amplitude waveform of the oscillation angle of the oscillating mirror 11 being driven according to a driving signal generated based on a reference phase clock (reference clock). Compared to the amplitude and offset control, the phase control must be performed with high accuracy. If the amplitude and offset control and the phase control are performed at the same time, they interfere with each other. This in turn increases the variation of the driving signal and the time required before all control values are kept within the target values. Therefore, it is preferable to first perform the amplitude and offset control for coarse adjustment and to perform the phase control for fine adjustment after the amplitude and offset control to reduce the time required before the control values are kept within the target values.

In the phase control, the phase shift (the time interval C in FIG. 6 (d)) between the output signal of the light-receiving element PD1 and the reference phase clock is detected by a phase comparator 115 and measured by a counter 116. The measured phase shift is converted by a low pass filter (LPF) 117 and an integrator 118 into a corresponding direct voltage and a control process is performed to shift the phase of the amplitude waveform according to the direct voltage such that the phase shift (the time interval C) between the reference phase clock (reference clock) and the output signal of the light-receiving element PD1 becomes constant (i.e., phase locked loop (PLL) control is performed). In the control process, a sine wave signal having an appropriate phase corresponding to a level in a predetermined phase shift scale (resolution) is generated. Then, the driving signal for the oscillating mirror 11 is corrected based on the sine wave signal and the oscillating mirror 11 is controlled according to the corrected driving signal to cancel the phase shift between the actual amplitude waveform and the ideal amplitude waveform of the oscillation angle of the oscillating mirror 11.

The signal generation resolution for generating the sine wave signal for the phase control is preferably higher than the control limit. However, increasing the signal generation resolution increases the amount of memory required and therefore increases the costs of the optical scanning device. Therefore, in this embodiment, the signal generation resolution for the sine wave signal is set at about 50 μm (or smaller) that is visually perceptible as a color shift in the sub-scanning direction.

Figure 10:
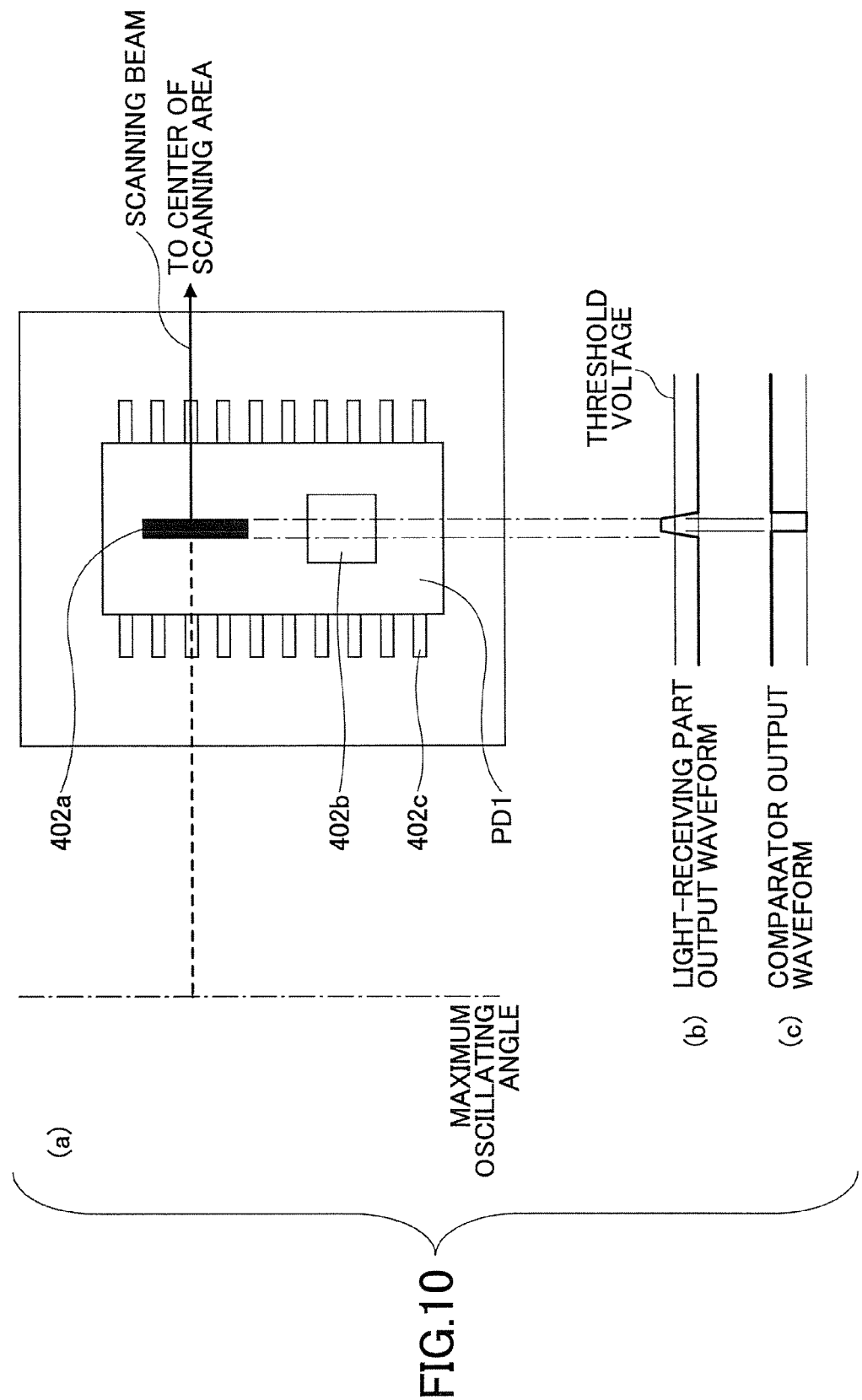
FIG. 10 is a drawing illustrating the relationship between a light-receiving element and a scanning laser beam.

FIG. 10 is a drawing illustrating the relationship between the light-receiving element PD1 and a scanning laser beam. As shown in FIG. 1, the light-receiving element PD1 is placed in a position where a laser beam scanning the light-receiving element PD1 becomes optically equal (in the laser beam diameter and the scanning speed) to a laser beam scanning a photoconductor. The light-receiving element PD1 is preferably placed on a line extending from the scanning line on a photoconductor. However, if this is not possible due to layout restrictions, the light-receiving element PD1 may be placed in any other position and the laser beam may be deflected by a reflective mirror to enter the light-receiving element PD1.

As shown in FIG. 10 (a), the light-receiving element PD1 includes a light-receiving part 402a implemented by a PIN photodiode and circuitry 402b including an amplifier circuit for amplifying an output signal from the light-receiving part 402a and a comparator circuit for shaping the waveform of the output signal. These components are packaged as an IC and covered by a laser beam transmitting material made of resin. The light-receiving element PD1 also includes IC leads 402c. When the scanning laser beam passes through the light-receiving part 402a, the circuitry 402b outputs a comparator output signal as shown by FIG. 10 (c).

The dotted line on the left-hand side of the light-receiving part 402a in FIG. 10(a) indicates an area where the light source is turned off (or the light intensity is reduced to such a level that the flare does not become intense enough to affect the light-receiving element or to form a latent image on a photoconductor). If the light source is turned on in an area between the maximum oscillation angle of the oscillating mirror 11 and a position near the light-receiving element PD1, the light from the light source is diffused by optical elements disposed in the optical scanning device 5 and the diffused light causes ghosting. The ghosting causes noise in signals output from the light-receiving elements PD1 and PD2 and thereby affects the time intervals A, B, and C and the pulse widths. This in turn makes it difficult to properly and stably control the oscillating mirror 11 and reduces the accuracy of adjusting the position of the oscillating mirror 11. In this embodiment, to prevent or reduce this problem, the light source is turned off (or the light intensity is reduced to such a level that the ghosting does not become intense enough to affect the light-receiving elements or to form a latent image on a photoconductor) at the timing shown in FIG. 10. Turning off the light source or reducing the light intensity as described above also makes it possible to extend the service lifetime and reduce the temperature rise of the light source. In the above descriptions, "a position near the light-receiving element PD 1" indicates a position where the light source is turned on. At the position, light emitted from the light source does not affect the comparator output signal and it becomes possible to correctly measure the time intervals A, B, and C.

Meanwhile, if the reflectivity or the transmittance of optical elements is reduced because of time degradation, the intensity of light arriving at the light-receiving element is reduced and the rise time of an output signal from the light-receiving part to a threshold voltage (FIG. 10), which determines the comparator output pulse, increases (the slope angle of the output signal decreases). As a result, a detected comparator output pulse becomes inaccurate. In this embodiment, to prevent or reduce this problem, the light source is controlled such that the light intensity of a laser beam scanning the light-receiving element PD1 (or PD2) becomes constant.

In the above embodiment, a driving signal with a sine wave is used. However, generating a sine wave requires a large number of bits for DA conversion and a large amount of memory. Therefore, a rectangular wave, which can be generated using a crystal oscillator at low cost, may be used instead of a sine wave. Also in the above embodiment, the oscillating mirror 11 is driven to scan the photoconductor back and forth. In other words, the photoconductor is scanned such that the scanning position moves in the sub-scanning direction as it moves toward the limit of the maximum oscillation angle (i.e., the photoconductor is scanned in a zigzag). With this method, characters may become unclear and density irregularity may occur near the ends of the image area. In such a case, the photoconductor may be scanned only in one way (one direction).

An exemplary configuration of a color image forming apparatus according to an embodiment of the present invention is described below.

FIG. 11 shows a configuration of a tandem color image forming apparatus including the optical scanning device 5 of the above embodiment and photoconductors 3Y, 3M, 3C, and 3K arranged in parallel. From top down, the optical scanning device 5, developing units 6 (6Y, 6M, 6C, and 6K), the photoconductors 3 (3Y, 3M, 3C, and 3K), an intermediate transfer belt 2, a fusing unit 7, and a paper-feed cassette 1 are arranged in the color image forming apparatus.

The photoconductors 3Y, 3M, 3C, and 3K correspond to the color components and are disposed above the intermediate transfer belt 2 at regular intervals. The photoconductors 3Y, 3M, 3C, and 3K have substantially the same diameter. Around the photoconductors 3Y, 3M, 3C, and 3K, other components are arranged according to the order of steps in an electrophotographic process. Take, for example, the photoconductor 3Y. Around the photoconductor 3Y, a charger (not shown), the developing unit 6Y, a transfer charger (not shown), and a cleaning unit (not shown) are arranged in the order mentioned. The photoconductor 3Y is scanned by a laser beam L1 emitted from the optical scanning device 5 according to an image signal. Similar components are also arranged around the respective photoconductors 3M, 3C, and 3K. Thus, in this embodiment, laser beams L1, L2, L3, and L4 are emitted from the optical scanning device 5 to scan the photoconductors 3Y, 3M, 3C, and 3K (target surfaces) corresponding to the color components.

The photoconductor 3Y is uniformly charged by the charger and rotates in the direction of arrow A in FIG. 11 so that it is scanned in the sub-scanning direction by the laser beam L1. As a result, an electrostatic latent image is formed on the photoconductor 3Y. The developing unit 6Y is disposed downstream of the scanning position of the laser beam L1 with respect to the rotational direction of the photoconductor 3Y and supplies yellow toner to the photoconductor 3Y. The yellow toner supplied from the developing unit 6Y adheres to areas on the photoconductor 3Y where the electrostatic latent image is formed and as a result, a yellow toner image is formed. In a similar manner, magenta, cyan, and black monochrome toner images are formed on the photoconductors 3M, 3C, and 3K, respectively. The intermediate transfer belt 2 is disposed downstream of the developing unit 6Y with respect to the rotational direction.

The intermediate transfer belt 2 is stretched over rollers 2a, 2b, and 2c and is rotated by a motor (not shown) in the direction of arrow B. With the rotation, a point on the intermediate transfer belt 2 passes under the photoconductors 3Y, 3M, 3C, and 3K in this order. The monochrome images developed on the photoconductors 3Y, 3M, 3C, and 3K are transferred to and superposed on the intermediate transfer belt 2 to form a color image. Then, the color image is transferred onto paper being conveyed from the paper-feed tray 1 in the direction of arrow C. The transferred color image is fused to the paper by the fusing unit 7 and the paper with the color image is ejected.

Embodiments of the present invention provide an optical scanning device including an oscillating mirror used for a laser raster scanning optical system and a color image forming apparatus including the optical scanning device. An oscillating mirror has low power consumption and makes it possible to reduce the temperature rise of a scanning lens and vibration in an optical scanning device and to reduce the temperature difference between optical scanning systems in a color image forming apparatus. An optical scanning device according to embodiments of the present invention makes it possible to form a laser beam spot with a small diameter and thereby makes it possible to improve the image quality while making use of the above advantages of an oscillating mirror.

According to an embodiment of the present invention, an optical scanning device includes a light source unit configured to emit a laser beam; an oscillating mirror configured to deflect the laser beam from the light source unit; a scanning/imaging optical system configured to focus the deflected laser beam on a target surface; and plural light-receiving elements configured to receive the laser beam in a scanning area of the laser beam. The position of the oscillating mirror is adjusted such that time intervals between output pulses in output signals of the respective light-receiving elements become substantially the same between the light-receiving elements and/or widths of the output pulses become substantially the same between the light-receiving elements. This configuration makes it possible to form a laser beam spot with a diameter that is small enough to form a high-quality image with a resolution of 600 dpi or higher while making use of advantages (low power consumption and low noise) of an oscillating mirror.

According to another embodiment of the present invention, the optical scanning device further includes a control unit and the position of the oscillating mirror is adjusted while the amplitude of an amplitude waveform of the oscillating mirror is kept constant by the control unit. This configuration makes it possible to reduce the influence of jitter on the output signals of the light-receiving elements, to improve the adjustment accuracy, and thereby to stably form a laser beam spot with a small diameter.

According to another embodiment of the present invention, the optical scanning device further includes an arithmetic unit configured to measure the time intervals between and/or the widths of the output pulses in the output signals of the respective light-receiving elements two or more times and to average the measured time intervals and/or the measured widths. This configuration makes it possible to reduce the influence of sudden electric noise on the output signals of the light-receiving elements, to improve the adjustment accuracy, and thereby to stably form a laser beam spot with a small diameter.

According to another embodiment of the present invention, the position of the scanning/imaging optical system is adjusted after the position of the oscillating mirror is adjusted. This makes it possible to more finely tune the optical scanning device and thereby makes it possible to more accurately form a laser beam spot with a small diameter.

According to an embodiment of the present invention, the oscillating mirror is configured to deflect a plurality of laser beams emitted from plural light sources to scan corresponding target surfaces; and the light receiving elements are disposed in the scanning/imaging optical system corresponding to one of the target surfaces. This configuration makes it possible to reduce the size and power consumption of the optical scanning device.

Figure 12:
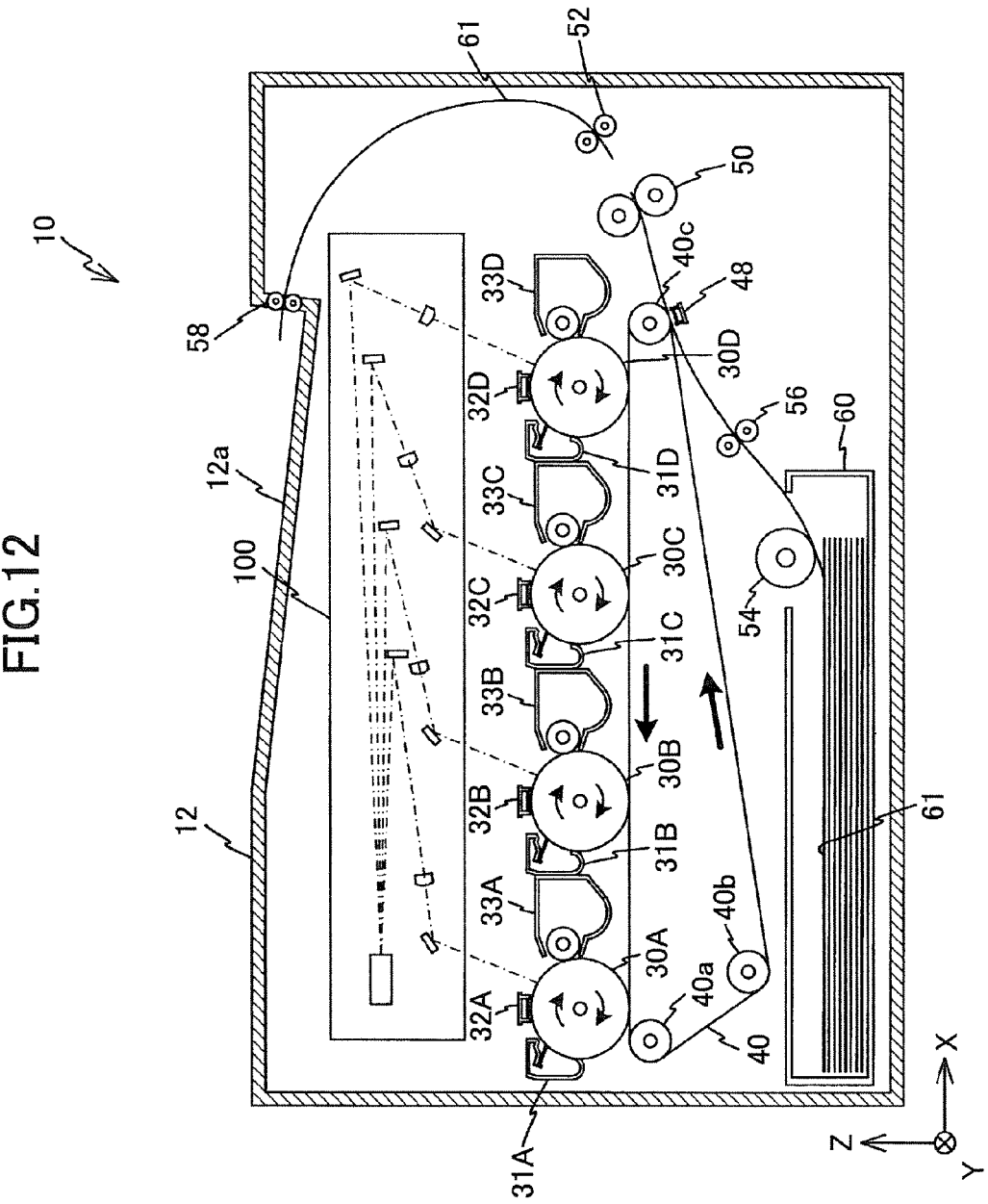
FIG. 12 is a drawing illustrating an image forming apparatus according to an embodiment of the present invention.

FIG. 12 is a schematic diagram illustrating a configuration of an image forming apparatus 10 according to an embodiment of the present invention.

The image forming apparatus 10 is a tandem color printer for printing a color image by superposing toner images of, for example, black, yellow, magenta, and cyan on paper. As shown in FIG. 12, the image forming apparatus 10 includes an optical scanning device 100, four photoconductive drums 30A, 30B, 30C, and 30D, a transfer belt 40, a paper-feed tray 60, a paper-feed roller 54, first resist-rollers 56, second resist-rollers 52, fusing rollers 50, paper-ejecting rollers 58, a control unit (not shown) for controlling other components, and a housing 12 for housing the above components.

The housing 12 is a hollow part shaped like a cuboid. On the upper side of the housing 12, a paper-catch tray 12a is formed to catch printed paper.

The optical scanning device 100 scans the photoconductive drums 30 with laser beams modulated based on image information provided from a higher-order device (such as a personal computer). More specifically, the optical scanning device 100 scans the photoconductive drum 30A with a laser beam corresponding to a black component, scans the photoconductive drum 30B with a laser beam corresponding to a cyan component, scans the photoconductive drum 30C with a laser beam corresponding to a magenta component, and scans the photoconductive drum 30D with a laser beam corresponding to a yellow component. The configuration of the optical scanning device 100 is described later.

Each of the photoconductive drums 30 is a cylindrical part with a photosensitive layer that becomes conductive when illuminated by a laser beam. The photoconductive drums 30 are disposed at regular intervals in the X-axis direction below the optical scanning device 100.

The photoconductive drum 30A is disposed at the −X end in the housing 12 such that its longitudinal direction becomes parallel to the Y-axis direction and is rotated clockwise in FIG. 12 (in the direction of the arrow shown in FIG. 12) by a rotating mechanism (not shown). Around the photoconductive drum 30A, a charger 32A is disposed at twelve o'clock (on the upper side), a toner cartridge 33A is disposed at two o'clock, and a cleaning case 31A is disposed at 10 o'clock.

The charger 32A is disposed above the photoconductive drum 30A with a predetermined clearance between its surface and the surface of the photoconductive drum 30A such that its longitudinal direction becomes parallel to the Y-axis direction. The charger 32A charges the surface of the photoconductive drum 30A with a predetermined voltage.

The toner cartridge 33A includes a cartridge body filled with black toner and a developing roller charged by a voltage having opposite polarity to that of the photoconductive drum 30A. The toner cartridge 33A supplies the toner in the cartridge body via the developing roller to the surface of the photoconductive drum 30A.

The cleaning case 31A includes a rectangular cleaning blade that is long in the Y-axis direction and is disposed such that one end of the cleaning blade touches the surface of the photoconductive drum 30A. The toner adhering to the surface of the photoconductive drum 30A is removed by the cleaning blade as the photoconductive drum 30A rotates and is put into the cleaning case 31A.

The photoconductive drums 30B through 30D have substantially the same configuration as that of the photoconductive drum 30A and are arranged at intervals on the +X side of the photoconductive drum 30A. Around the respective photoconductive drums 30B through 30D, chargers 32B through 32D, toner cartridges 33B through 33D, and cleaning cases 31B through 31D are arranged in a positional relationship similar to the case of the photoconductive drum 30A.

The chargers 32B through 32D have substantially the same configuration as that of the charger 32A and charge the surfaces of the photoconductive drums 30B through 30D with a predetermined voltage, respectively.

The toner cartridges 33B through 33D, respectively, include cartridge bodies filled with cyan, magenta, and yellow toners and developing rollers charged by a voltage having opposite polarity to that of the photoconductive drums 30B through 30D. The toner cartridges 33B through 33D supply the toners in the cartridge bodies via the developing rollers to the surfaces of the corresponding photoconductive drums 30B through 30D.

The cleaning cases 31B through 31D have substantially the same configuration as that of the cleaning case 31A and function in a similar manner.

Here after, the photoconductive drum 30A, the charger 32A, the toner cartridge 33A, and the cleaning case 31A are collectively called a first station; the photoconductive drum 30B, the charger 32B, the toner cartridge 33B, and the cleaning case 31B are collectively called a second station; the photoconductive drum 30C, the charger 32C, the toner cartridge 33C, and the cleaning case 31C are collectively called a third station; and the photoconductive drum 30D, the charger 32D, the toner cartridge 33D, and the cleaning case 31D are collectively called a fourth station.

The transfer belt 40 is an endless belt and is stretched over a driven roller 40a disposed below the photoconductive drum 30A, a driven roller 40c disposed below the photoconductive drum 30D, and a drive roller 40b placed in a position slightly lower than the driven rollers 40a and 40c such that the upper surface of the transfer belt 40 touches the lower surfaces of the photoconductive drums 30A through 30D. When the drive roller 40b is rotated counterclockwise in FIG. 12, the transfer belt 40 is turned counterclockwise (in the direction of the arrows in FIG. 12). A transfer charger 48 is disposed near the +X end of the transfer belt 40. A voltage having opposite polarity to that of the chargers 32A through 32D is applied to the transfer charger 48.

The paper-feed tray 60 is disposed below the transfer belt 40. The paper-feed tray 60 is shaped like a cuboid and contains a stack of paper sheets 61 used as recording media. A rectangular paper-feed opening is formed in the upper wall near the +X end of the paper-feed tray 60.

The paper sheets 61 are fed from the paper-feed tray 60 one by one by the paper-feed roller 54 into a gap between the first resist rollers 56 including a pair of rollers. Each of the paper sheets 61 is further conveyed by the first resist rollers 56 into a gap between the transfer belt 40 and the transfer charger 48.

The fusing rollers 50, including a pair of rollers, heat and press the printed paper sheet 61 and convey the paper sheet 61 via the second resist rollers 52 to the paper-ejecting rollers 58.

The paper-ejecting rollers 58 include a pair of rollers and eject the paper sheet 61 onto the paper catch tray 12a.

Figure 13:
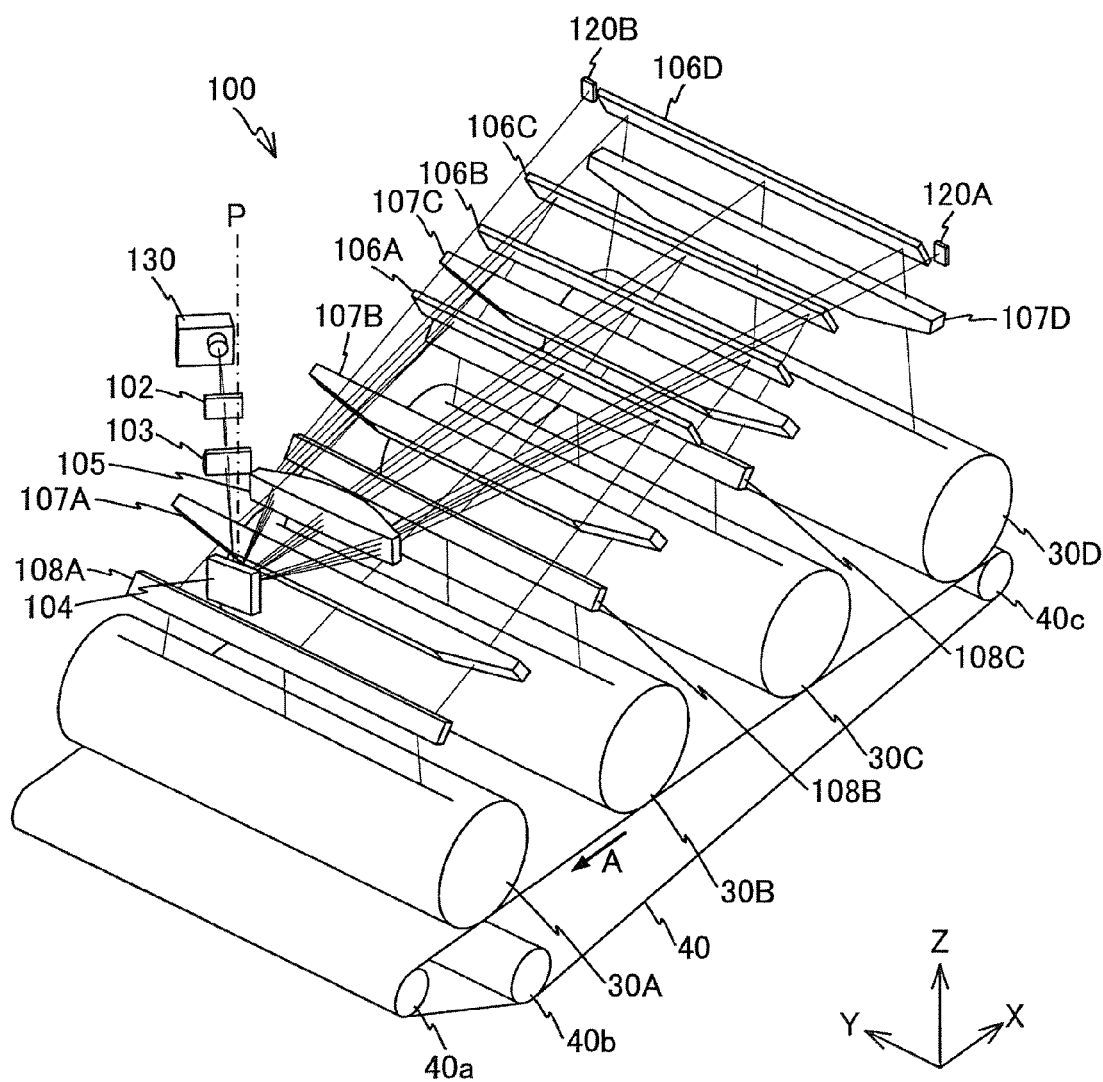
FIG. 13 is a perspective view illustrating a schematic layout of components of an optical scanning device.
Figure 14:
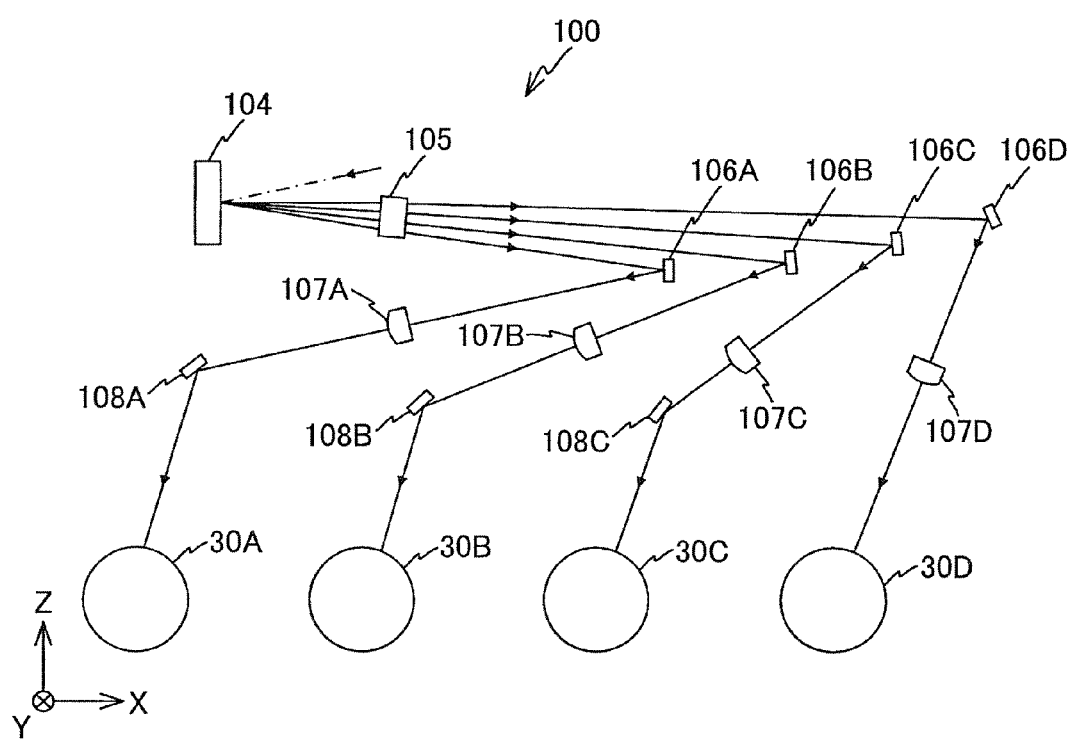
FIG. 14 is a side view illustrating a schematic layout of components of an optical scanning device.

An exemplary configuration of the optical scanning device 100 is described below. FIGS. 13 and 14 are drawings illustrating a schematic layout of components of the optical scanning device 100. As shown in FIGS. 13 and 14, the optical scanning device 100 includes a deflection unit 104 disposed substantially above (on the +Z side of) the photoconductive drum 30A; a first scanning lens 105 and reflection mirrors 106A, 106B, 106C, and 106D that are arranged in this order on the +X side of the deflection unit 104; a pair of synchronization sensors 120A and 120B disposed on the corresponding sides of the reflection mirror 106D; a second scanning lens 107A disposed below the first scanning lens 105; second scanning lenses 107B, 107C, and 107D disposed in this order on the +X side of the second scanning lens 107A; reflection mirrors 108A, 108B, and 108C disposed substantially above the corresponding photoconductive drums 30A, 30B, and 30C; and a second cylinder lens 103, a first cylinder lens 102, and a light source unit 130 arranged on a line extending from the deflection unit 104 and forming an angle δ with the X-axis.

Below, an xy coordinate system is used for the descriptions of a light source 131 of the light source unit 130. The xy coordinate system is obtained by rotating the XY coordinate system by the angle δ about the Z-axis.

The light source unit 130 includes the light source 131 (see FIG. 15) for emitting multiple laser beams and a coupling lens 132 (see FIG. 19) for shaping the laser beams emitted from the light source 131 into substantially collimated laser beams.

Figure 15:
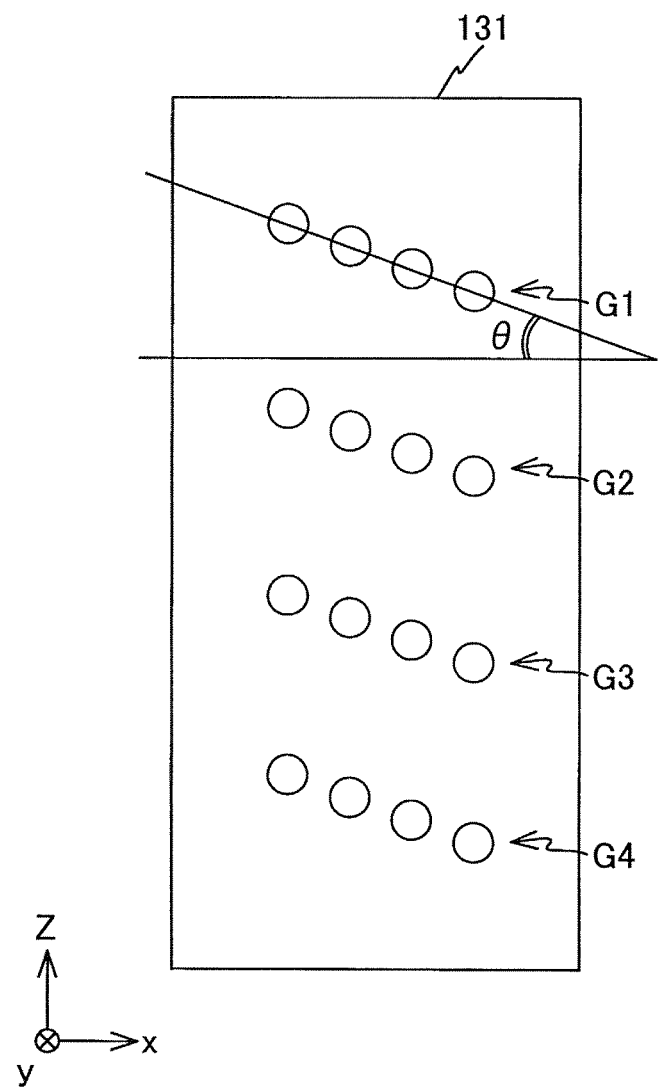
FIG. 15 is a plan view illustrating a laser array.

The light source 131 is a surface-emitting semiconductor laser array. As shown in FIG. 15, 16 light-emitting areas are arranged on the −y surface of the light source 131 to form a 4×4 matrix where the rows are at an angle θ with respect to the x-axis and the columns are parallel to the Z-axis. Hereafter, four light-emitting areas in the first row are called a first light-emitting area group G1, four light-emitting areas in the second row are called a second light-emitting area group G2, four light-emitting areas in the third row are called a third light-emitting area group G3, and four light-emitting areas in the fourth row are called a fourth light-emitting area group G4.

In the light source unit 130, laser beams from the respective light-emitting areas of the light source 131 are substantially collimated by the coupling lens 132 and are emitted in the −y direction (toward the deflection unit 104).

As shown in FIG. 13, the first cylinder lens 102 and the second cylinder lens 103 are disposed between the light source unit 130 and the deflection unit 104. The first cylinder lens 102 shapes the laser beams emitted from the light source unit 130 into a predetermined shape and the second cylinder lens 103 focuses the laser beams from the first cylinder lens 102 on the deflection surface of the deflection unit 104.

Figure 16:
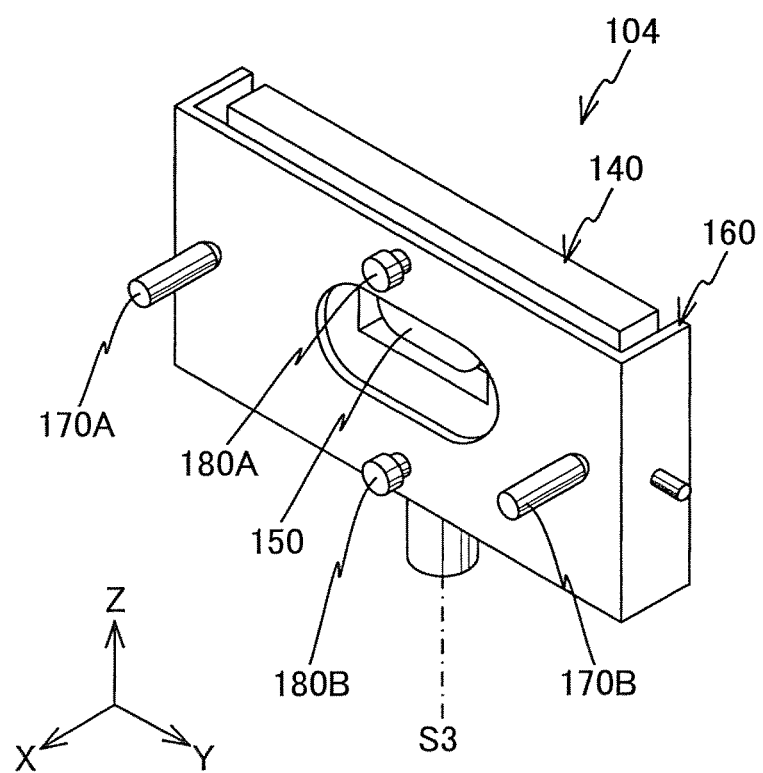
FIG. 16 is a perspective view of a deflection unit.
Figure 17:
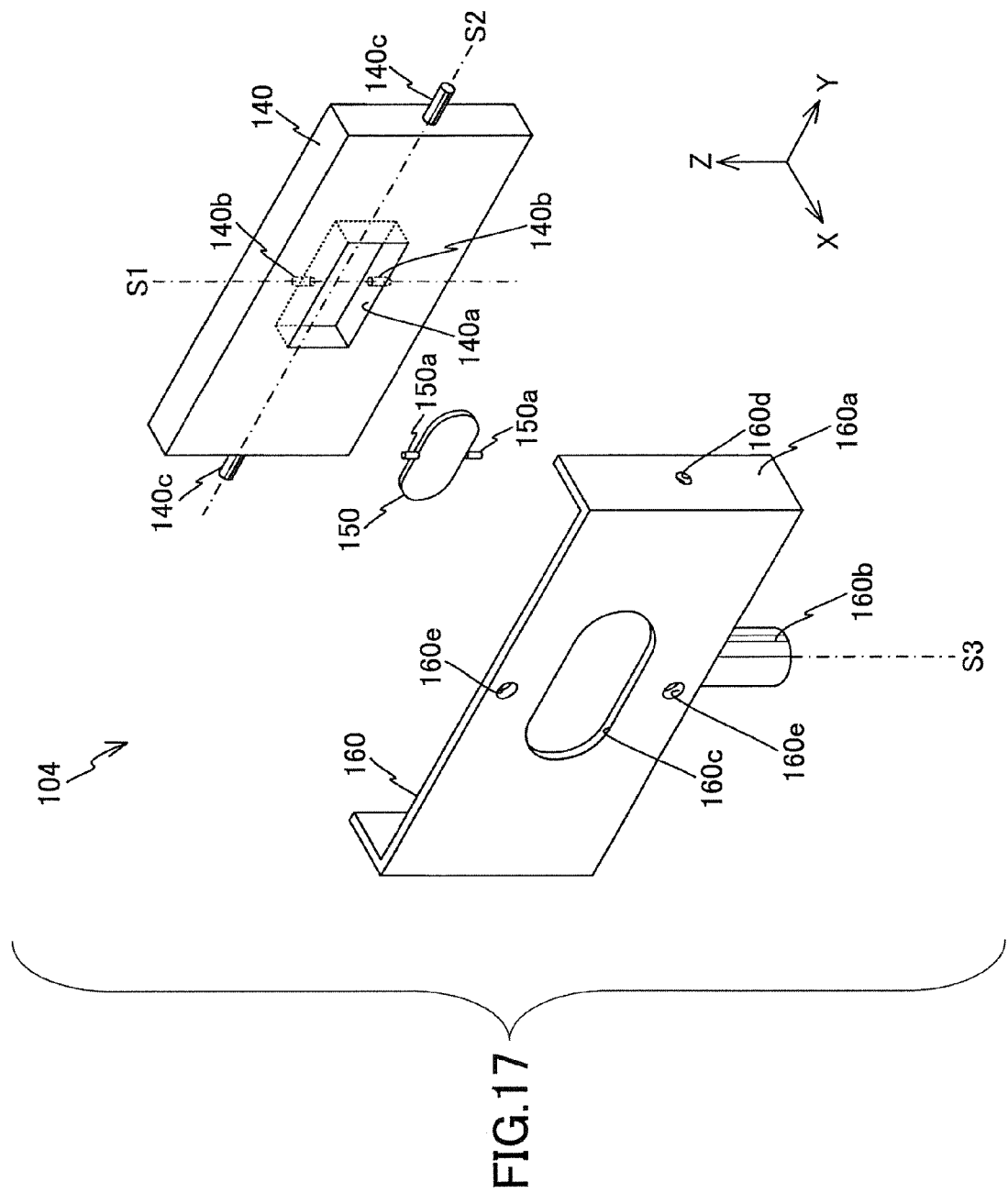
FIG. 17 is an exploded perspective view of a deflection unit.

FIG. 16 is a perspective view of the deflection unit 104 and FIG. 17 is an exploded perspective view of the deflection unit 104. As shown in FIGS. 16 and 17, the deflection unit 104 includes an oscillating mirror 150 having a deflection surface for deflecting laser beams, a supporting part 140 for supporting the oscillating mirror 150 such that the oscillating mirror 150 can rotate about an axis parallel to the Z-axis, and a holder 160 for holding the supporting part 140.

Referring to FIG. 17, the oscillating mirror 150 is shaped like an oval plate that is long in the Y-axis direction. The +X side of the oscillating mirror 150 serves as the deflection surface that is parallel to the Z-Y plane. Column-shaped oscillation shafts 150a are formed at the upper and lower ends of the oscillating mirror 150. In this embodiment, the pair of oscillation shafts 150a are aligned with an axis that passes through the center of the deflection surface of the oscillating mirror 150 and that is parallel to the Z-axis.

The supporting part 140 is shaped like a rectangular plate that is long in the Y-axis direction. Column-like protrusions 140c are formed in the centers of the +Y and −Y surfaces of the supporting part 140. The protrusions 140c are long in the Y-axis direction and are disposed on an axis S2 that is parallel to the Y-axis. A rectangular recess 140a, which is long in the Y-axis direction, is formed in the center portion of the +X surface of the supporting part 140. Also, bearings 140b are formed in the upper and lower walls of the recess 140a (+Z and −Z internal surfaces). The bearings 140b are long in the Z-axis direction and are disposed on an axis S1 that is parallel to the Z-axis. In this embodiment, the protrusions 140c and the bearings 140b of the supporting part 140 are in the same plane parallel to the Z-Y plane.

The oscillating mirror 150 is attached to the supporting part 140 by inserting the oscillation shafts 150a into the corresponding bearings 140b formed in the recess 140a of the supporting part 140. With this configuration, the oscillating mirror 150 is supported by the supporting part 140 so as to be rotatable about the axis S1.

Figure 18:
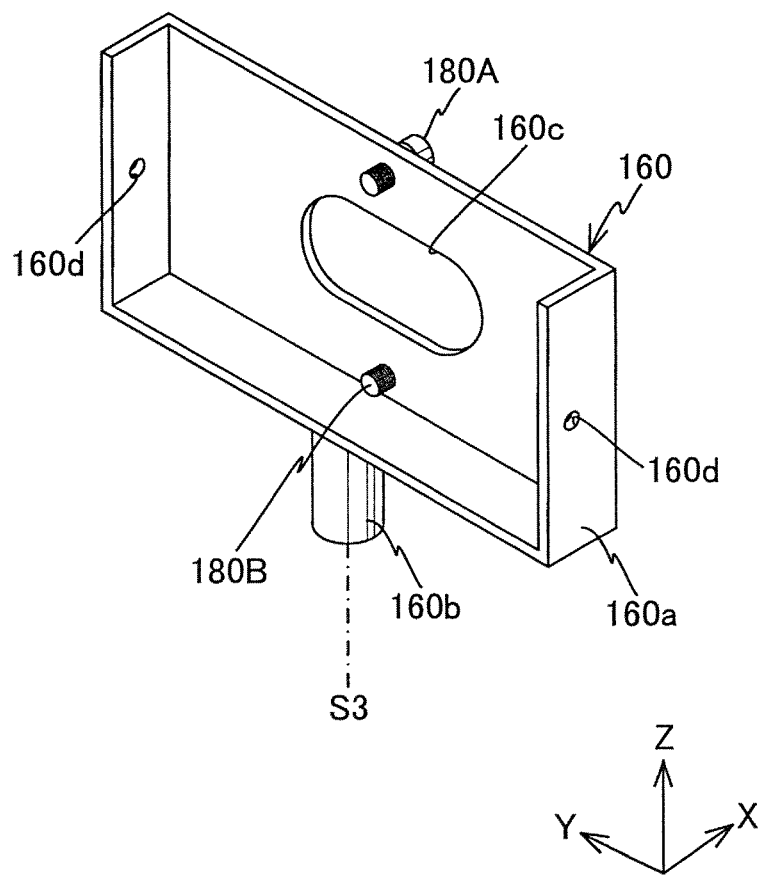
FIG. 18 is a perspective view of a holder.

As shown in FIGS. 17 and 18, the holder 160 is shaped like a rectangular plate that is long in the Y-axis direction and having an oval opening 160c. A U-shaped frame 160a protruding in the −X direction is formed on the −X surface of the holder 160 along the +Y, −Y, and −Z edges. Through holes 160d are formed to pass through the +Y and −Y walls of the frame 160a in the Y-axis direction. A rotational shaft 160b is attached to the center of the lower surface of the frame 160a. The frame 160a is supported by the rotational shaft 160b so as to be rotatable about the axis S3. In this embodiment, the through holes 160d formed in the side walls of the frame 160a are in the same plane that includes the axis S3 and is parallel to the Z-Y plane.

The supporting part 140 is attached to the holder 160 by inserting the protrusions 140c into the corresponding through holes 160d formed in the frame 160a of the holder 160. With this configuration, the supporting part 140 is supported by the holder 160 so as to be rotatable about the axis S2.

Referring to FIGS. 17 and 18, two threaded screw holes 160e are formed, one on each of the +Z and −Z sides of the opening 160c, to pass through the holder 160 in the X-axis direction. Two positioning screws 180A and 180B are screwed into the corresponding threaded screw holes 160e from the +X side. According to this embodiment, the supporting part 140 can be positioned with respect to the holder 160 by rotating the supporting part 140 about the axis S2 to a desired angle and by fixing the position with the positioning screws 180A and 180B in the threaded screw holes 160e of the holder 160. The positioning screws 180A and 180B are rotated to touch the +X surface of the supporting part 140 to fix its position.

The deflection unit 104 configured as described above is fixed in the optical housing of the optical scanning device 100 with the rotational shaft 160b being supported by a supporting part (not shown). The rotational position about the axis S3 of the deflection unit 104 is determined by bringing the −X ends of a pair of positioning parts 170A and 170B, which are movable in the X-axis direction, into contact with the +X surface of the holder 160 as shown in FIG. 16. The positioning parts 170A and 170B are implemented, for example, by screws screwed into a certain part (not shown) in the optical scanning device 100.

Laser beams emitted from the light source unit 130 enter the deflection unit 104 via the first cylinder lens 102 and the second cylinder lens 103. More specifically, the laser beams pass through the opening 160c of the holder 160 and fall on the center of the deflection surface (incident point) of the oscillating mirror 150 supported by the supporting part 140. The laser beams incident on the oscillating mirror 150 are periodically deflected and scanned in the +Y and −Y directions when the oscillating mirror 150 is periodically rotated (caused to oscillate) about the axis S1 in the "+" and "−" directions. In this embodiment, as shown by a dashed-dotted line in FIG. 14, the laser beams are incident on the deflection surface of the oscillating mirror 150 at a predetermined angle with respect to the X-Y plane.

Referring to FIGS. 13 and 14, the laser beams are deflected and scanned periodically by the deflection unit 104. As a result, the image plane of the laser beams produced by the first scanning lens 105 moves at a constant speed along the Y-axis.

The reflection mirrors 106A through 106D are long in the Y-axis direction, and reflect and guide the laser beams from the first scanning lens 105 to the corresponding second scanning lenses 107A through 107D.

The second scanning lenses 107A through 107C are long in the Y-axis direction, and focus the laser beams reflected by the reflection mirrors 106A through 106C via the reflection mirrors 108A, 108B, and 108C, which are long in the Y-axis direction, on the surfaces of the corresponding photoconductive drums 30A through 30C. The second scanning lens 107D is long in the Y-axis direction and focuses the laser beam reflected by the reflection mirror 106D on the surface of the photoconductive drum 30D.

The synchronization sensors 120A and 120B are disposed, respectively, on the −Y and +Y sides of the reflection mirror 106D, and output photoelectric conversion signals corresponding to the intensity of entered laser beams.

Figure 19:
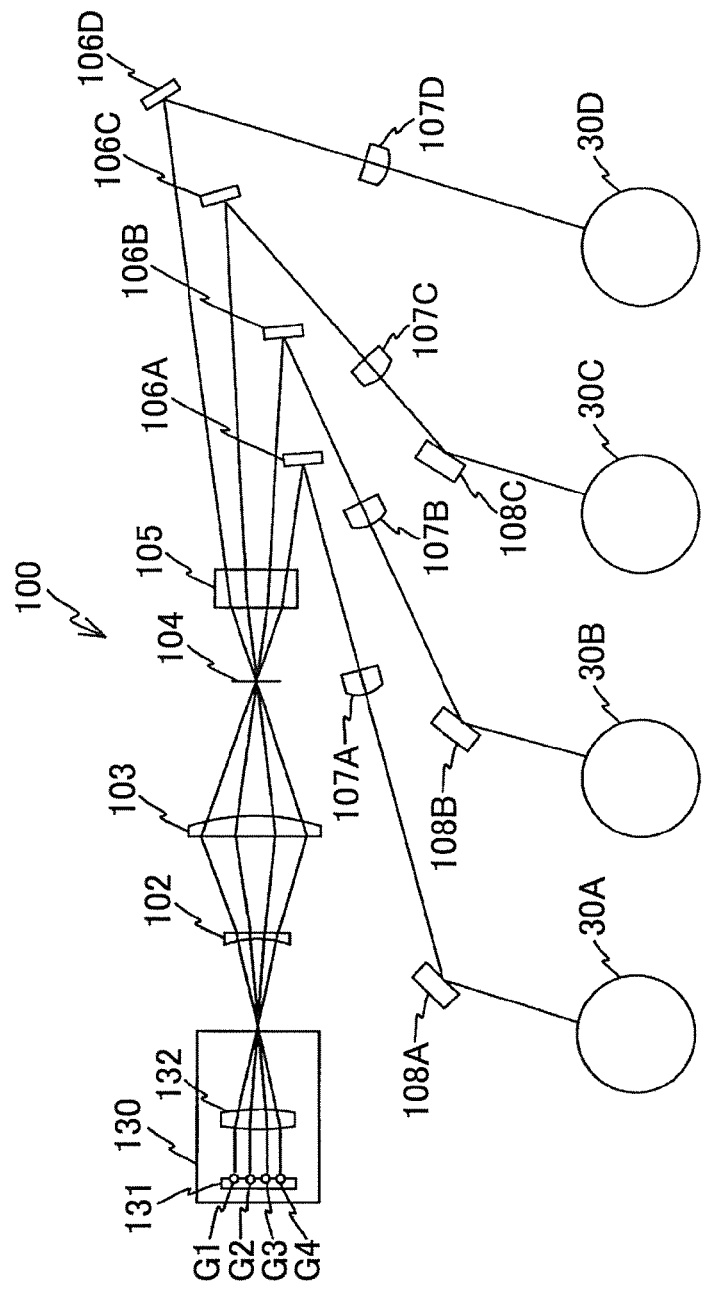
FIG. 19 is a drawing illustrating an optical layout of an optical scanning device.

FIG. 19 shows an optical layout illustrating optical paths of laser beams in the optical scanning device 100 configured as described above.

Exemplary operations of the optical scanning device 100 and the image forming apparatus 10 are described below with reference to FIG. 19. Laser beams emitted from the light-emitting area groups G1, G2, G3, and G4 are caused to cross by the coupling lens 132, distanced by the first cylinder lens 102 from each other in the sub-scanning direction, and enter the second cylinder lens 103. The second cylinder lens 103 focuses the laser beams on the center of the deflection surface of the oscillating mirror 150 constituting a part of the deflection unit 104. The laser beams deflected by the deflection unit 104 move away from each other and enter the first scanning lens 105.

The laser beam entering the first scanning lens 105 from the light-emitting area group G1 is reflected by the reflection mirror 106D and enters the second scanning lens 107D. Then, the laser beam is focused by the second scanning lens 107D on the surface of the photoconductive drum 30D.

The laser beams entering the first scanning lens 105 from the light-emitting area groups G2 through G4 are reflected, respectively, by the reflection mirrors 106C, 106B, and 106A and enter the corresponding second scanning lenses 107C, 107B, and 107A. Then, the laser beams are focused by the second scanning lenses 107C, 107B, and 107A via the reflection mirrors 108C, 108B, and 108A on the corresponding photoconductive drums 30C, 30B, and 30A.

The focused spots of the laser beams from the light-emitting area groups G1, G2, G3, and G4 are caused to move back and forth in the Y-axis direction on the surfaces of the corresponding photoconductive drums 30A through 30D by the oscillation of the oscillating mirror 150. In other words, the surfaces of the photoconductive drums 30A through 30D are scanned in the Y-axis direction (main-scanning direction) by the laser beams from the four light-emitting area groups.

Meanwhile, the photosensitive layers forming the surfaces of the photoconductive drums 30A through 30D are charged by the chargers 32A through 32D with a predetermined voltage to have a uniform charge density distribution. When the photoconductive drums 30A through 30D are scanned as described above, scanned parts of the photosensitive layers become conductive and the electric potential of the scanned parts becomes 0. Thus, it is possible to form electrostatic latent images, which are defined by the charge distributions, on the surfaces of the photoconductive drums 30A through 30D by modulating the laser beams incident on the surfaces of the photoconductive drums 30A through 30D, which are rotating in the directions of the arrows in FIG. 12, based on image information and in synchronization with the variation of output signals from the synchronization sensors 120A and 120B.

After electrostatic latent images are formed, toners are supplied to the surfaces of the photoconductive drums 30A through 30D by the developing rollers of the corresponding toner cartridges 33A through 33D shown in FIG. 12. Because the developing rollers of the toner cartridges 33A through 33D are charged by a voltage with an opposite polarity to that of the photoconductive drums 30A through 30D, the toners on the developing rollers are charged to the same polarity as that of the photoconductive drums 30A through 30D. Accordingly, the toners adhere only to the scanned parts (discharged parts) of the surfaces of the photoconductive drums 30A through 30D and do not adhere to the charged parts. As a result, the electrostatic latent images are visualized by the toners and toner images are formed on the surfaces of the photoconductive drums 30A through 30D. The formed toner images are transferred onto the transfer belt 40.

Thus, in the image forming apparatus 10, when image information is received from a higher-order device, the light source 131 of the light-source unit 130 is driven according to modulation data generated based on the image information, and toner images corresponding to respective color components are formed by the first through fourth stations and superposed on the transfer belt 40.

The superposed toner images (a color image) formed on the transfer belt 40 are transferred by the transfer charger 48 onto the paper sheet 61 fed from the paper-feed tray 60 and are fused to the paper sheet 61 by the fusing rollers 50 as shown in FIG. 12. The paper sheet 61 with the formed image is ejected by the paper-ejecting rollers 58 onto the paper-catch tray 12a.

As described above, in the deflection unit 104 of this embodiment, the oscillation shafts 150a of the oscillating mirror 150 are arranged on (or aligned with) an axis passing through the center of the deflection surface of the oscillating mirror 150. Also, the protrusions 140c and the bearings 140b of the supporting part 140 are arranged in the same plane. With this configuration, the axis S1 and the axis S2 shown in FIG. 17 cross at right angles at the center of the deflection surface of the oscillating mirror 150 and are in the same plane as the deflection surface. Also, the through holes 160d formed in the side walls of the frame 160a of the holder 160 are in the same plane that includes the axis S3. Therefore, the axis S3 passes through the intersection of the axes S1 and S2 regardless of the rotational angle of the supporting part 140 about the axis S2.

In other words, in this embodiment, the oscillating mirror 150 can be rotated about the axis S2 that is parallel to the Y-axis without moving the center of the deflection surface by rotating the supporting part 140 with respect to the holder 160. Also, the oscillating mirror 150 can be rotated about the axis S3 that is parallel to the Z-axis without moving the center of the deflection surface by rotating the holder 160 with respect to the rotational shaft 160b.

This configuration makes it possible to easily align the optical position of the center of oscillation of the oscillating mirror 150 and the optical position of the center in the main-scanning direction of the scanning areas defined on the surfaces of the photoconductive drums 30A through 30D.

Figure 20:
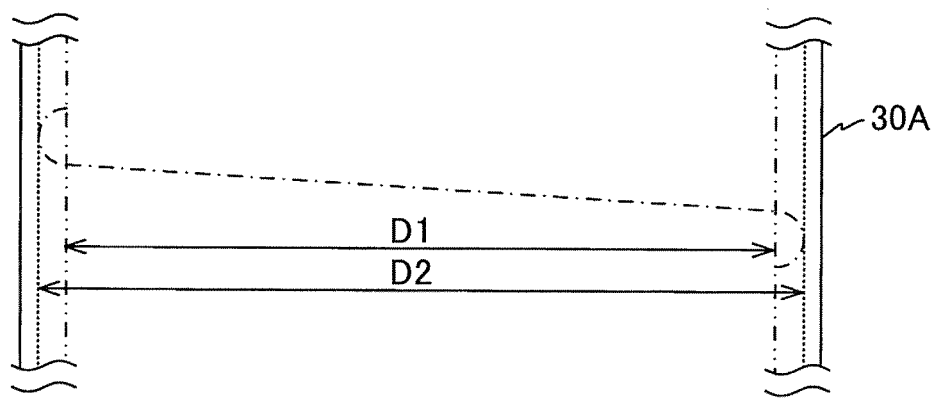
FIG. 20 is a drawing illustrating the positional relationship between the center of a scanning area and the center of oscillation of an oscillating mirror.

FIG. 20 shows a scanning area defined on the photoconductive drum 30A by imaginary lines (two-dot chain lines) and having a width D1 in the main-scanning direction. In FIG. 20, the dashed-dotted line indicates the range in the main-scanning direction (hereafter called main-scanning range) within which the spot of a laser beam scanned by the oscillating mirror moves. As described above, the above configuration of this embodiment makes it possible to easily align the center in the main-scanning direction of the scanning area defined on the photoconductive drum 30A with the center of the main-scanning range of the laser beam by rotating the holder 160 about the axis S3.

Also in this embodiment, as shown in FIG. 13, the synchronization sensors 120A and 120B are disposed near the ends of the reflection mirror 106D. This makes it possible to continuously or regularly adjust the rotational angle of the holder 160 about the axis S3 based on output signals of the synchronization sensors 120A and 120B.

Further, the above embodiment makes it possible to easily adjust the incident positions of laser beams on the photoconductive drums 30A through 30D in the sub-scanning direction by rotating the supporting part 140 with respect to the holder 160 and thereby rotating the oscillating mirror 150 about the axis S2.

Thus, the optical scanning device 100 of this embodiment makes it possible to cause laser beams to accurately fall on the scanning areas defined on the photoconductive drums 30A through 30D and thereby makes it possible to accurately scan the photoconductive drums 30A through 30D. Also, the image forming apparatus 10 of this embodiment can form a high-quality image on the paper sheet 61 based on latent images accurately formed on the surfaces of the photoconductive drums 30A through 30D.

According to this embodiment, the optical scanning device 100 includes the light source 131 configured to emit multiple laser beams. Alternatively, the optical scanning device 100 may include multiple laser diodes or edge-emitting lasers each of which emits one laser beam. Also, the optical scanning device 100 may be configured to scan the photoconductive drums 30A through 30D with one laser beam.

In the above embodiment, the image forming apparatus 100 is configured as a color printer for forming a color image. Alternatively, the image forming apparatus 10 may be configured as a monochrome printer for forming a monochrome image.

In the above embodiment, it is assumed that the optical scanning device 100 is used in a printer. However, the optical scanning device 100 may also be used for other types of image forming apparatuses such as a copier, a facsimile machine, and a multifunction copier including functions of them.

An embodiment of the present invention provides an optical scanning device that makes it possible to easily adjust its optical characteristics and to accurately scan a target surface.

Another embodiment of the present invention provides an image forming apparatus capable of accurately forming a high-resolution image.

An embodiment of the present invention provides an optical scanning device for scanning a target surface with a laser beam in a main-scanning direction. The optical scanning device includes a light source configured to emit the laser beam; a deflector including a deflection surface configured to rotate about a first axis that is orthogonal to the main-scanning direction and to deflect the laser beam emitted from the light source; and a supporting part configured to support the deflector so as to be rotatable about a second axis that is parallel to the main-scanning direction.

This configuration makes it easier to adjust the rotational position of the deflector about the second axis and thereby makes it possible to accurately scan a target surface.

The present invention is not limited to the specifically disclosed embodiments, and variations and modifications may be made without departing from the scope of the present invention.

The present application is based on Japanese Priority Application No. 2007-321562 filed on Dec. 13, 2007 and Japanese Priority Application No. 2008-062137 filed on Mar. 12, 2008, the entire contents of which are hereby incorporated herein by reference.

What is claimed is:

1. A method of adjusting a mounting position of an oscillating mirror of an optical scanning device, the method comprising:
providing the optical scanning device, and wherein the optical scanning device includes:
a light source unit configured to emit a laser beam;
the oscillating mirror configured to deflect the laser beam from the light source unit, the oscillating mirror having an electrode;
a holder including a bracket configured to hold the oscillating mirror, the bracket including an electrode for providing an electrical connection to the electrode of the oscillating mirror, a position of the bracket being adjustable in a rotational direction about an oscillation axis of the oscillating mirror, and wherein the oscillating mirror is configured to oscillate about the oscillation axis relative to the bracket;
a scanning/imaging optical system configured to focus the deflected laser beam on a target surface; and
at least first and second light-receiving elements configured to receive the laser beam in a scanning area of the laser beam, and
wherein the oscillating mirror is configured to cause the laser beam to enter the light-receiving elements through the scanning/imaging optical system, and wherein each light-receiving element is located at a scanning position between a corresponding edge of the target surface and a scanning position at a maximum oscillation angle of the oscillating mirror, such that each light-receiving element outputs a first output pulse as the laser beam scans from an edge of the target surface to a maximum oscillation angle scanning position and a second output pulse as the laser beam scans from a maximum oscillation angle scanning position to an edge of the target surface;
adjusting the position of the bracket in the rotational direction about the oscillation axis of the oscillating mirror such that a time interval between the first and second output pulses of the first light-receiving element and a time interval between the first and second output pulses of the second light-receiving element, as represented in output signals of the respective light-receiving elements, become substantially the same between the light-receiving elements, and widths of the output pulses become substantially the same between the light-receiving elements;

controlling the oscillating mirror based on the output signals of the light-receiving elements such that the amplitude of an amplitude waveform of the oscillating mirror becomes constant, a mounting position of the oscillating mirror being adjusted while the amplitude of the amplitude waveform of the oscillating mirror is kept constant by the control unit;

adjusting a mounting position of the scanning/imaging optical system by moving the scanning/imaging optical system in a main-scanning direction, and wherein the step of adjusting the mounting position of the scanning/imaging optical system by moving the scanning/imaging optical system in the main-scanning direction occurs after the mounting position of the bracket is adjusted based on the output signals of the light-receiving elements.

2. The method as claimed in claim 1, further comprising the step of measuring the time intervals between and/or the widths of the output pulses in the output signals of the respective light-receiving elements two or more times and averaging the measured time intervals and/or the measured widths.

3. The method as claimed in claim 2, wherein the light source unit includes a plurality of light sources, the oscillating mirror is configured to deflect a plurality of laser beams emitted from the light sources to scan corresponding target surfaces, and the light receiving elements are disposed in the scanning/imaging optical system corresponding to one of the target surfaces.

* * * * *